(12) United States Patent
Kojima

(10) Patent No.: US 7,518,802 B2
(45) Date of Patent: Apr. 14, 2009

(54) ILLUMINATION DEVICE, IMAGE DISPLAY DEVICE, AND PROJECTOR

(75) Inventor: Hideki Kojima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 880 days.

(21) Appl. No.: 10/930,756

(22) Filed: Sep. 1, 2004

(65) Prior Publication Data

US 2007/0171646 A1    Jul. 26, 2007

(30) Foreign Application Priority Data

Sep. 24, 2003 (JP) ............................. 2003-331666

(51) Int. Cl.
G02B 27/14 (2006.01)
G02B 27/12 (2006.01)
(52) U.S. Cl. ....................... 359/634; 359/639
(58) Field of Classification Search .......... 359/634
See application file for complete search history.

(56) References Cited

U.S. PATENT DOCUMENTS

| 5,519,518 | A | 5/1996 | Watanabe et al. |
| 5,597,223 | A | 1/1997 | Watanabe et al. |
| 5,622,418 | A | 4/1997 | Daijogo et al. |
| 5,760,875 | A | 6/1998 | Daijogo et al. |
| 6,033,091 | A | 3/2000 | Daijogo et al. |
| 6,879,311 | B2 | 4/2005 | Sono |
| 7,170,567 | B2 | 1/2007 | Ouchi et al. |
| 2001/0030740 | A1 * | 10/2001 | Mori et al. ............ 355/53 |

FOREIGN PATENT DOCUMENTS

| JP | A-04-318515 | 11/1992 |
| JP | A-05-100179 | 4/1993 |
| JP | A-05-303085 | 11/1993 |
| JP | A-06-102484 | 4/1994 |
| JP | A-06-138842 | 5/1994 |
| JP | U-06-055131 | 7/1994 |
| JP | A-07-199183 | 8/1995 |
| JP | A-07-270719 | 10/1995 |
| JP | A-08-022006 | 1/1996 |
| JP | A-08-106090 | 4/1996 |
| JP | A-09-210911 | 8/1997 |
| JP | A-10-500221 | 6/1998 |

(Continued)

*Primary Examiner*—Jordan M. Schwartz
*Assistant Examiner*—James C Jones
(74) *Attorney, Agent, or Firm*—Oliff & Berridge, PLC

(57) ABSTRACT

An illumination device to increase or decrease a quantity of light, while maintaining a uniform illumination intensity distribution, an image display device that displays high-quality images with a wide dynamic range, and a projector are provided. The illumination device includes a light source including a lamp and a concave mirror and emitting an illumination light, a variable diaphragm, for example in the form of a shutter having a linear edge and controlling the quantity of the illumination light, and a rotary prism which is an illumination light scanning device to scan the illumination light that passed through the variable diaphragm over an irradiated surface. The axis of the direction in which the illumination light is scanned over the irradiated surface almost coincides with the axis of the direction in which the variable diaphragm controls the illumination light. Here, the control modes in the +x axis direction, –x axis direction and ±x axis direction are used to match the axis.

9 Claims, 12 Drawing Sheets

FOREIGN PATENT DOCUMENTS

| | | |
|---|---|---|
| JP | A-2000-028994 | 1/2000 |
| JP | A-2001-1000689 | 4/2001 |
| JP | A-2002-072361 | 3/2002 |
| JP | A-2002-264386 | 9/2002 |
| JP | A-2002-287067 | 10/2002 |
| JP | A-2002-328332 | 11/2002 |
| JP | A-2003-121782 | 4/2003 |
| JP | A-2003-207850 | 7/2003 |
| JP | A-2003-228046 | 8/2003 |
| JP | A-2003-255250 | 9/2003 |
| JP | A-2003-262808 | 9/2003 |
| JP | A-2003-302698 | 10/2003 |
| JP | A-2003-307777 | 10/2003 |
| JP | A-2003-344833 | 12/2003 |
| WO | WO 03/056842 A1 | 7/2003 |

* cited by examiner (FIG. 2-1)

ILLUMINATION DEVICE, IMAGE DISPLAY DEVICE, AND PROJECTOR

BACKGROUND OF THE INVENTION

1. Field of Invention

Exemplary aspects of the present invention relate to an illumination device, an image display device, and a projector. Specifically, the exemplary aspects of present invention relate to an illumination device to illuminate with uniform illumination intensity a spatial light modulation device, such as a liquid-crystal light valve or tilt mirror device, to an image display device equipped with such an illumination device, and to a projector to display an image by causing the illumination light modulated with the image display device to fall on a projection lens and projecting the illumination light from the projection lens onto a screen or the like.

2. Description of Related Art

The following related art methods vary the brightness of the illumination light in illumination devices to supply an illumination light to an image display device or the like. A method to vary the brightness of the illumination light by limiting the luminous flux with a variable diaphragm. See JP-A-2002-72361. A method to vary the brightness with an optical modulator, such as a liquid-crystal panel. See JP-A-2001-100689. A method to vary the brightness of the illumination light by varying the brightness of the lamp of a light source. See JP-A-6-102484.

SUMMARY OF THE INVENTION

Variable diaphragms usually cut off the light by limiting the luminous flux that passes therethrough from the periphery. Therefore, for example, when a spatial light modulation device is illuminated by using an illumination device, it is difficult to vary the brightness of the illumination light, while maintaining a uniform illumination intensity distribution on the illuminated surface of the spatial light modulation device.

For this reason, in the configuration disclosed in the aforementioned JP-A-2002-72361, the illumination light is split into a plurality of luminous fluxes and then an integrator is used to conduct illumination by superimposing the split luminous fluxes. Further, as described in JP-A-2002-72361, the split luminous fluxes are cut off from the periphery. In this case, the cut off luminous flux and the non-cut off luminous flux are superimposed on the irradiated surface. Therefore, the phenomenon of decreased uniformity of illumination intensity distribution on the irradiated surface can be somewhat moderated. However, the integrator is generally optically designed under an assumption of obtaining a uniform illumination intensity distribution by superposition of a plurality of absolutely non-cut off luminous fluxes. Therefore, if some of the split luminous fluxes are cut off in a general integrator, the balance of illumination intensity distribution is lost and uniform illumination cannot be obtained. In particular, the collapse of illumination intensity distribution becomes even more significant if the cut-off region of the split luminous flux increases.

Further, with the method disclosed in JP-A-2001-100689, the brightness of the illumination light is varied by varying the quantity of light in the entire cross section of the luminous flux with an optical modulator, such as a liquid-crystal panel. Therefore, the problems of decreased uniformity of illumination intensity distribution on the irradiated surface are hardly encountered. However, because the illumination light is constantly emitted on the optical modulator, even if the quantity of light is varied so as to avoid any reduction in light intensity, the brightness is still decreased according to the transmittance of the optical modulator. In particular, when a liquid-crystal panel is used, the problems are associated with transmittance and heat resistance. Therefore, such a method is sometimes unsuitable for illumination devices used in projectors requiring increased luminance.

Further, with the method described in JP-A-6-102484, brightness of the illumination light is varied by varying the brightness of the lamp itself. In this case, a lamp is required which enables instantaneous adjustment to the desired brightness. In particular, high-luminance high-pressure discharge lamps have been used in illumination devices employed in projectors. The problem associated with such high-pressure discharge lamps is that the lamp itself is difficult to control to the desired brightness instantaneously.

With the foregoing in view, exemplary aspects of the present invention provide an illumination device in which brightness of the illumination light can be varied, while maintaining a uniform illumination intensity distribution, an image display device producing high-quality images with a wide dynamic range, and a projector.

In order to address and/or resolve the above-mentioned and/or other problems, the first exemplary aspect of the invention provides an illumination device including a light source to emit an illumination light, a variable diaphragm to control the quantity of the illumination light, and an illumination light device to scan the illumination light that passed through the variable diaphragm over the irradiated surface. The axis of the direction in which the illumination light is scanned over the irradiated surface almost coincides with the axis of the direction in which the variable diaphragm controls the illumination light.

With the first exemplary aspect of the invention, the illumination light with the quantity of light controlled with the variable diaphragm is scanned over the irradiated surface with the illumination light scanning device. Here, the "control of quantity of light" means the decrease in the quantity of light by cutting off the illumination light with the variable diaphragm and the increase in the quantity of passing light by opening the variable diaphragm from the state in which the quantity of light was decreased. The quantity of illumination light thus can be increased or decreased with the variable diaphragm. Further, because the illumination light is thus scanned over the illumination surface with the illumination light scanning device, an almost uniform illumination intensity distribution can be obtained if time averaging is conducted with respect to the region in the irradiated surface that is scanned with the illumination light. Further, it is important that in this state the axis of the direction in which the illumination light is scanned over the irradiated surface almost coincides with the axis of the direction in which the variable diaphragm controls the illumination light over the irradiated surface. Here, "the axis of the direction in which the variable diaphragm controls the illumination light" is the axis of the direction in which the quantity of illumination light decreases or increases on the irradiated surface as a result of cutting off the illumination light with the variable diaphragm or increasing the quantity of passing light by opening the variable diaphragm.

Further, explaining the expression "the axis coincides" in greater detail, for example, when the illumination light is scanned in the +x axis direction in the irradiated surface in the xy plane with orthogonal axes, this expression means that the illumination light is subjected to control of the three following types, that is, control in the +x axis direction, control in the −x axis direction, and control in the ±x axis direction. Therefore, almost matching the axis of the direction in which the illumination light is scanned over the irradiated surface with the axis of the direction in which the variable diaphragm controls the illumination light when the quantity of light is controlled with the variable diaphragm makes it possible to vary only the brightness with an almost uniform illumination intensity distribution, practically without changes in the size of the region in which the illumination light is scanned over the irradiated surface.

Further, in an exemplary embodiment of the first exemplary aspect of the invention, the variable diaphragm may be provided in the conjugate plane or in the vicinity of the conjugate plane of the irradiated surface. Generally, the cross-sectional shape of the illumination light in the conjugate plane or in the vicinity of the conjugate plane of the irradiated surface is almost similar to the cross-sectional shape of the illumination light falling on the irradiated surface. Therefore, if the illumination light in the conjugate plane of the irradiated surface or in the vicinity of the conjugate plane is cut off with the variable diaphragm, the cross-sectional shape of the illumination light can be almost similarly controlled. Therefore, the brightness of illumination light irradiated on the irradiated surface can be varied easily and reliably. Further, eventually only the brightness can be easily varied, with a uniform illumination intensity distribution, with respect to the region scanned with the illumination light in the irradiated surface.

In an exemplary embodiment of the first exemplary aspect of the invention, the variable diaphragm may be capable of controlling the quantity of light only with respect to a specific wavelength region contained in the illumination light. For example, instead of cutting off the light mechanically with a shutter blade, a color filter can be used to change the transmittance of light with respect to a specific wavelength region. Further, the quantity of light of a specific wavelength in the illumination light falling on a color filter can be varied by changing the position of the color filter in the light flux of the illumination light. Because the illumination light is scanned over the irradiated surface with the illumination light scanning device, an almost uniform illumination intensity distribution can be obtained by conducting time averaging for the region of the irradiated surface scanned with the illumination light. As a result, eventually, the brightness and color purity can be varied at the same time, with an almost uniform illumination intensity distribution, with respect to the region of the irradiated surface scanned with the illumination light.

Further, in an exemplary embodiment of the first exemplary aspect of the invention, the illumination device may include a rod to reflect the illumination light falling from the incoming end surface by the inner wall or outer wall and cause the light to be emitted from the outgoing end surface and an image forming lens to form an image of the outgoing end surface of the rod on the irradiated surface or a conjugate plane of the irradiated surface and that the variable diaphragm be provided in the vicinity of the outgoing end surface of the rod, at the conjugate plane of the outgoing end surface, or in the vicinity of the conjugate plane of the outgoing end surface. The so-called rod-type integrator can be used to obtain a uniform illumination intensity distribution on the irradiated surface. In this case, light from a plurality of secondary light source images is superimposed on the outgoing end surface of the rod. Further, the image forming lens forms an image of the outgoing end surface on the irradiated surface. With such a configuration, any region of the irradiated surface can be irradiated with the illumination light with a uniform illumination intensity distribution, while matching the illumination intensity distribution of the light source, by varying the combination of the shape of the outgoing end portion of the rod and the light-gathering factor of the image forming lens. In this case, the image of the outgoing end surface may be relayed to the irradiated surface by using a relay lens. The relay lens may be of a magnifying system or a reducing system. An image can be formed by the relay lens once or plurality of times. In the present exemplary embodiment, the variable diaphragm is provided in the vicinity of the outgoing end surface of the rod, at the conjugate plane of the outgoing end surface, or in the vicinity of the conjugate plane of the outgoing end surface. In this case, all the light fluxes superimposed on the irradiated surface can be almost identically controlled with the variable diaphragm. As a result, the brightness of the illumination light irradiating the irradiated surface can be varied easily and reliably. Further, because of the presence of the integrator function, the adjustment by increasing or decreasing the quantity of light can be very easily conducted to obtain the result identical to that of cutting off the illumination light with an almost uniform illumination intensity distribution with the variable diaphragm. Therefore, adjusting the quantity of light by increasing or decreasing can be easily conducted. Further, because the illumination light irradiating with an almost uniform illumination intensity distribution is scanned over the irradiated surface with the illumination light scanning device, eventually only the brightness can be easily varied, with an almost uniform illumination intensity distribution, with respect to the region scanned with the illumination light in the irradiated surface.

Further, in an exemplary embodiment of the first exemplary aspect of invention, the illumination device may include a lens array unit composed of a plurality of the fly-eye lenses to split the illumination light into a plurality of partial lights and condense them and a superposition lens unit to superimpose the partial lights on the irradiated surface or a plane conjugate with the irradiated surface, and that the variable diaphragm be provided in the vicinity of the fly-eye lenses, at the conjugate plane of the fly-eye lenses, or in the vicinity of the conjugate plane of the fly-eye lenses. With such a configuration, any region of the irradiated surface can be irradiated with the illumination light with a uniform illumination intensity distribution, while matching the illumination intensity distribution of the light source, by varying the combination of the outer shape of the lens array unit and the light-gathering factor of the superposition lens unit. Further, the illumination light may be superimposed on the plane conjugate with the irradiated surface. The illumination light superimposed on the image forming region can be converged with a relay image forming system. As a result, it is possible to obtain an effect identical to that of superimposing the illumination light on the irradiated surface. Further, the plane where the illumination light is superimposed may be a plane conjugate with the irradiated surface. In the present exemplary embodiment, a variable diaphragm is provided in the vicinity of the fly-eye lenses, at the conjugate plane of the fly-eye lenses, or in the vicinity of the conjugate plane of the fly-eye lenses. In this case, all the light fluxes superimposed on the irradiated surface can be almost identically controlled with the variable diaphragm. As a result, the brightness of the illumination light irradiating the irradiated surface can be varied easily and reliably. Further, because of the presence of the integrator function, the adjustment by increasing or decreasing the quantity of light can be conducted to obtain a result identical to that of cutting off the illumination light with an almost uniform illumination intensity distribution with the variable diaphragm. Further, because the illumination light irradiating with an almost uniform illumination intensity distribution is scanned over the irradiated surface with the illumination light scanning device, eventually only the brightness can be easily varied, with an almost uniform illumination intensity distribution, with respect to the region scanned with the illumination light in the irradiated surface.

Further, in an exemplary embodiment of the first exemplary aspect of the invention, the illumination light scanning device may have a rotary prism which is rotated to vary the diffraction angle of the illumination light and scan the illumination light. As a result, the illumination light with the quantity of light controlled with the variable diaphragm can be scanned with the rotary prism. Therefore, a configuration allowing the illumination light to be scanned over the irradiated surface can be realized.

Thus, eventually only the brightness can be easily varied, with an almost uniform illumination intensity distribution, with respect to the region of the irradiated surface that is scanned with the illumination light.

Further, the second exemplary aspect of the invention provides an image display device including the above-described illumination device and a spatial light modulation device to modulate the illumination light from the illumination device according to the image signal. As a result, the image display device can be illuminated with a uniform illumination intensity by providing an image display device in the vicinity of the irradiated surface of the above-described illumination device. Further, a wide dynamic range can be used by increasing or decreasing the quantity of light on the irradiated surface according to the image signal. For example, the brightness of the illumination light is controlled (increased or decreased) according to the peak value of the luminosity of the inputted image signal. In this case, because the brightness of the illumination light is controlled (increased or decreased) according to the peak value of the luminosity of the inputted image signal, the representation region with a gradation close to a black level can be expanded in the image display device, while maintaining the gradation of the entire body such as a white level. As a result, the dynamic range can be expanded. In addition, when a small quantity of signals with a high peak value of luminosity is contained in an image which is dark as a whole, then the representation close to the black level becomes more important than that close to the white level. Therefore, the dynamic range can be also expanded by expanding the representation region with a gradation close to the black level, even if the gradation close to the white level becomes different from that of the input signal, by controlling the brightness of the illumination light to a level somewhat lower than the peak value of the luminosity. Further, besides a method of varying the intensity of the illumination light according to the image signal, the intensity can be fixed to any level according to the environment used or viewer preference. Specifically, when the device is used in a dark environment, viewing is possible even if the brightness is not at a necessary level or above. Therefore, the brightness of the illumination light can be reduced. When the device is used in a bright environment, viewing is impossible if the illumination light is too dark. Therefore, the brightness of the illumination light can be increased. The adjustment of the brightness can be conducted manually or in an automated mode.

The possibility of reducing blurring of dynamic images will be explained hereinbelow as another effect attained with the second exemplary aspect of the invention. Based on the difference in the display method, the displays can be divided into impulse-type and hold-type displays. In impulse-type displays, light is displayed in each pixel at a degree of brightness necessary for instantaneous display. For example, a CRT (cathode-ray tube) is an impulse-type display. In hold-type displays, light is displayed in each pixel at a level of brightness necessary to conduct display within a fixed interval. Liquid-crystal displays hold-type displays. A projector using a liquid crystal light valve is also a hold-type display. Generally, the impulse-type displays and hold-type displays differ in the dynamic image display performance due to the difference in display methods. For example, blurring in the hold-type displays is greater than in the impulse-type displays.

Larger blurring in the hold-type displays than in the impulse-type displays can be explained as follows. In the impulse-type displays, the light is generated instantaneously. Therefore, the afterimage appearing in the brain due to integration decreases. By contrast, in the hold-type displays, the light is continuously generated within a fixed interval. Therefore, the afterimage appearing in the brain due to integration can increase easily.

With the configuration of the second exemplary aspect of the invention, the illumination light is cut off with the variable diaphragm. Therefore, in the instantaneous interval, the irradiation of the illumination light is conducted with the illumination device only on part of the image formation region of the spatial light modulation device. However, because the illumination light can be scanned over the image formation region with the illumination light scanning device of the illumination device, within a certain time range, the illumination light with a uniform illumination intensity distribution is irradiated over the entire image formation region. As a result, when the image display device is viewed directly, the image can be recognized by the human eye. At the same time, if attention is paid to part of the image formation region, the illumination light sometimes falls thereon and sometimes not. Therefore, a phenomenon identical to intermittent switching occurs. For this reason, though the spatial light modulator is of a hold type, it can display a vivid dynamic image.

Further, the third exemplary aspect of the invention there provides a projector including the above-described image display device and projection device to project the image displayed with the image display device. As a result, an image with a wide dynamic range displayed on the image display device and reduced dynamic image blurring can be enlarged and projected on a screen. In particular, in illumination devices employed in projectors, high-voltage discharge lamps with high luminosity have been used. The configuration of the present exemplary embodiment can be employed with such lamps and is, therefore, suitable as a projector.

Further, in an exemplary embodiment of the third exemplary aspect of the invention, the projector may include an optical sensor to detect at least one of the illumination intensity and chromaticity of the image projected with the projection device and that both the quantity of light controlled with the variable diaphragm by using the detected data from the optical sensor and the modulation quantity of the illumination light modulated with the spatial light modulation device are varied. As a result, it is possible to conduct the calibration taking into account the effect of the external light or color of the screen on the image projected on the screen. As a result, an optimum image adapted to the environment, such as the external light or color of the screen, can be obtained.

Further, in an exemplary embodiment of the third exemplary aspect of the invention, it is desirable that the projector include a color separation optical system to separate the illumination light that passed through the variable diaphragm into illumination lights of at least two colors. As a result, a high-quality full-color image with a wide dynamic range can be obtained with at least one variable diaphragm.

Further, in an exemplary embodiment of the third exemplary aspect of the invention, it is desirable that the projector include a color separation optical system to separate the illumination light into illumination lights of at least two colors and that the variable diaphragm be disposed in the optical path of at least one color light of the separated illumination light. As a result, quantity of light can be controlled with respect to a specific colored light.

BRIEF DESCRIPTION OF THE DRAWINGS

FIGS. 2-1 to 2-4 illustrate the operation of the rotary prism;

FIGS. 3-1 to 3-5 illustrate scanning of the illumination light;

FIG. 4-1 is a schematic of the illumination device of exemplary Embodiment 2; and FIG. 4-2 is a schematic of the variable diaphragm;

FIG. 5 is a schematic of the image display device of exemplary Embodiment 3;

FIGS. 10-1 to 10-2 are schematics of the projector of exemplary Embodiment 6;

DETAILED DESCRIPTION OF EXEMPLARY EMBODIMENTS

The exemplary embodiments of the present invention will be described below in greater detail based on the appended drawings. The present invention is not limited to those exemplary embodiments.

Exemplary Embodiment 1

Figure 1:
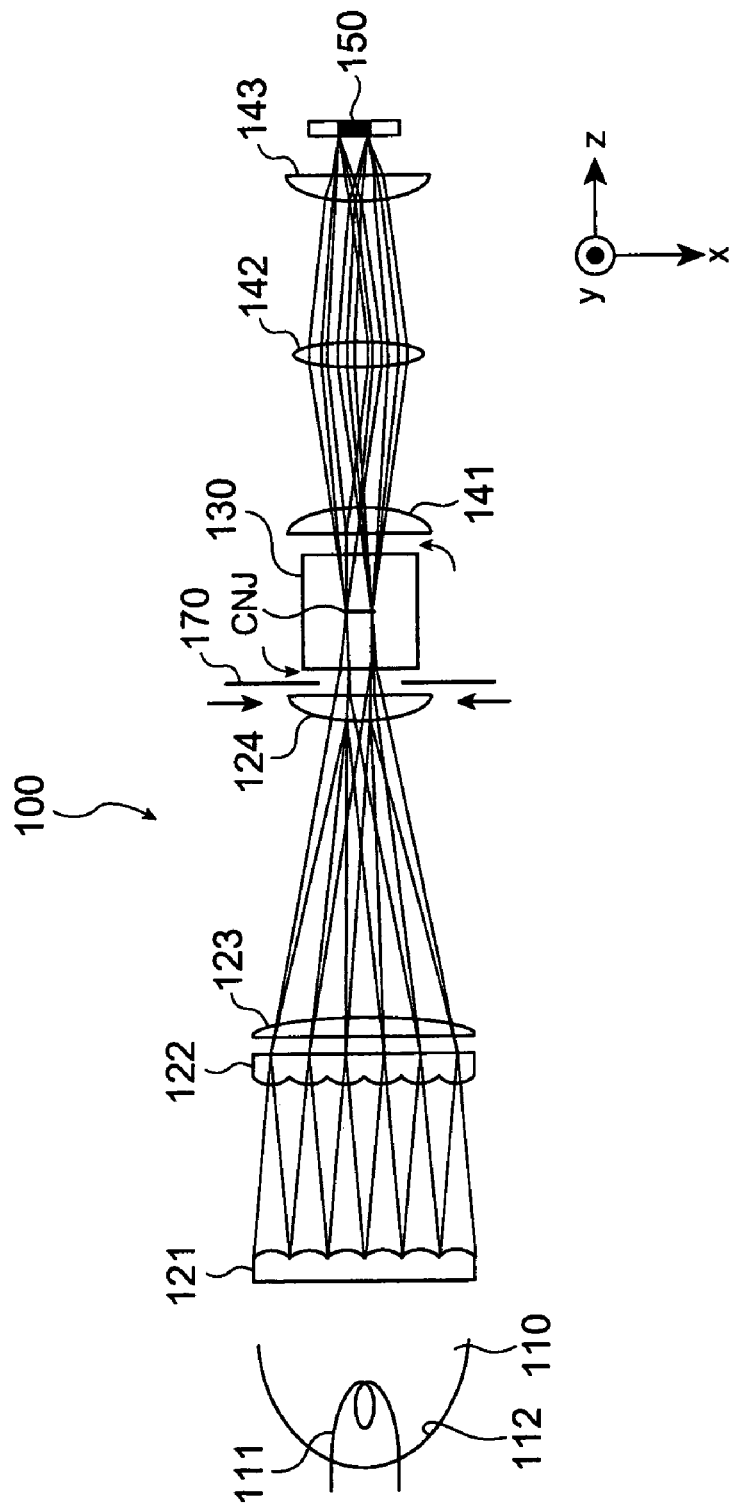
FIG. 1 is a schematic of the illumination device of exemplary Embodiment 1.

FIG. 1 is a schematic of an illumination device 100 of exemplary Embodiment 1. The illumination device 100 includes a light source 110, fly-eye lenses 121, 122, a superposition lens 123, a parallelizing lens (image forming lens) 124, a variable diaphragm 170, a rotary prism 130, and lenses 141, 142, 143 for image reforming.

The light source 110 is composed of a lamp 111 and a concave mirror 112. The lamp 111 is composed, for example, of a discharge lamp, such as a high-pressure mercury lamp, and the concave mirror 112 is composed of a parabolic mirror. Further, the lamp 111 and concave mirror 112 are not limited to the aforementioned configurations. In the light source 110, the lamp 111 generates an illumination light, the concave mirror 112 reflects the illumination light, and the illumination light with an illumination intensity distribution is emitted toward the fly-eye lenses 121, 122. At this time, appropriate modifications can be made with respect to the type, number and configuration of the light source. Thus, if the lamp 111 is a LED light source, it is possible to employ a configuration in which the illumination light is emitted toward the fly-eye lenses 121, 122 by using a condensing lens rather than the concave mirror 112 or a configuration in which a plurality of LED light sources are arranged in the form of an array.

The fly-eye lenses 121, 122 are lens arrays in which microlenses having a rectangular contour are arranged in the form of a matrix. Each microlens is so molded that the outer shape thereof has a ratio different with respect to the outer shape of the irradiated surface 150. Here, the outer shape of the irradiated surface 150 is a rectangle with a lateral/longitudinal ratio of 4:3 and the outer shape of each microlens is a rectangle with a lateral/longitudinal ratio of 4:1.

The fly-eye lens 121 splits the illumination light emitted from the light source 110 into a plurality of partial lights, and each partial light is condensed on a respective microlens of the fly-eye lens 122. The fly-eye lens 122 passes each of a plurality of split partial lenses and they fall on the superposition lens 123. The superposition lens 123 condenses a plurality of split partial lights via the parallelizing lens 124 and the image established by the outer shape of microlenses of the fly-eye lens 121 is formed inside the rotary prism 130. Referring to FIG. 1, the image is formed in a conjugate plane CNJ on the plane containing the rotation axis of the rotary prism 130.

Further, lenses 141, 142, 143 for image reforming represent an image reforming device to reform on the irradiated surface 150 the image that was formed by the fly-eye lenses 121, 122, superposition lens 123, and parallelizing lens 124. As a result, the conjugate plane CNJ becomes a conjugate plane of the irradiated surface 150. Further, because the object of employing the image reforming device is to form on the irradiated surface 150 the image that was formed with the image forming device, it may be a combination of curved mirrors rather than lenses. Further, the number of lenses or curved mirror and, therefore, the image expansion or contraction ratio, can be varied appropriately.

As described hereinabove, part of the irradiated surface 150 can be irradiated with the illumination light by using an irradiation optical system including the fly-eye lenses 121, 122, superposition lens 123, parallelizing lens 124 and lenses 141, 142, 143 for image reforming which represent image reforming device. Thus, because the lateral/longitudinal ratio of the outer shape of the fly-eye lens 121 is 4:1 and the image formation region of the irradiated surface 150 has a ratio of 4:3, a portion representing one third of the irradiated surface 150 can be irradiated with illumination light with a uniform illumination intensity distribution.

The fly-eye lenses 121, 122, superposition lens 123, parallelizing lens 124, and lenses 141, 142, 143 for image reforming which represent the image reforming device have a function of irradiating the illumination light on a region narrower than the irradiated surface 150 by converting at least one of the shape and size of the luminous flux of the illumination light emitted from the light source 110. With the configuration of the present exemplary embodiment as an example, the design may be such that the region illuminated by the illumination device 100 extends beyond the irradiated surface 150 in the ±y axis direction. Furthermore, the superposition lens 123 may superimpose the illumination light on the irradiated surface 150 rather than on the conjugate plane CNJ of the irradiated surface 150, as in the present exemplary embodiment.

The variable diaphragm 170 will be explained below. The variable diaphragm 170 is provided in the conjugate plane CNJ of the irradiated surface 150 or in the vicinity of the conjugate plane CNJ. The irradiated surface 150 has a region of the prescribed size. As a result, in the conjugate plane CNJ of the irradiated surface 150 or in the vicinity thereof, the cross-sectional shape of the illumination light is similar to the shape of the entire region of the irradiated surface 150. In the present exemplary embodiment, the variable diaphragm 170 is disposed in a position where the illumination light has a certain size rather than being a point. Therefore, the movement of the variable diaphragm 170 may be controlled with the usual resolution to cut off smoothly and accurately the desired quantity of light. As a result, mechanical load on the drive mechanism of the variable diaphragm 170 can be reduced.

Further, the variable diaphragm 170 reduces the quantity of light by moving so that a shutter with a linear edge cuts off the illumination light. Further, the shutter of the variable diaphragm 170 is so moved that the axis of the direction in which the illumination light is scanned in the irradiated surface 150 coincides with the axis of the direction in which the variable diaphragm 170 controls the illumination light. For example, referring to FIG. 1, let us consider the case of scanning the illumination light over the irradiated surface 150 in the +x direction. In this case, the direction of cutting off the illumination light is not limited to the +x axis direction and also includes cutting off the illumination light in the −x axis direction. Thus, when the illumination light is scanned in the +x axis direction in the irradiated surface 150, there are the following three control modes (1)-(3) of the variable diaphragm 170.

(1) Cutting off in the +x axis direction.
(2) Cutting off in the −x axis direction.
(3) Cutting off simultaneously in the ±x axis directions.

The shutter of the variable diaphragm 170 is so moved as to cut off the illumination light almost linearly from at least one direction of the +x axis direction and −x axis direction in the irradiated surface 150. Further, in the present exemplary embodiment, the shutter of a knife edge shape of the variable diaphragm 170 cuts off the illumination light from two directions, that is, ±x axis directions, at the same time, according to mode (3). As a result, the region illuminated by the present illumination device 100 on the irradiated surface 150 at a certain instant of time is an almost rectangular region which has a uniform illumination intensity distribution even if the illumination light is cut off with the variable diaphragm. Therefore, if time averaging is considered for the entire irradiated surface, then scanning of such an illumination light in the direction along the x axis in FIG. 1 makes it possible to obtain a uniform illumination intensity distribution.

A mechanism to scan the illumination light with the quantity of light controlled with the variable diaphragm 170 will be explained hereinbelow. The rotary prism 130 serving as an illumination light scanning device to scan the illumination light over the irradiated surface 150 is disposed between the parallelizing lens 124 and the lens 141 for image reforming. The illumination light passes through the rotary prism 130 toward the irradiated surface 150, while the optical axis is shifted due to the relationship between the refractive index and rotation of the rotary prism 130. The rotary prism 130 is composed of a prism in the form of a quadrangular column made from a glass material. Further, the rotary prism 130 is connected to an electro magnetic motor (not shown in the figure) and rotated under a rotation rate control.

The operation of the rotary prism 130 will be explained below in greater detail with reference to FIGS. 2-1 to 2-4.

The explanation will be conducted with respect to a case where the rotary prism rotates counterclockwise about an axis perpendicular to the sheet surface, as shown in the figure. In the rotation position of the rotary prism 130 shown in FIG. 2-1, the illumination light falling on the rotary prism 130 from the left side, as shown in the figure, propagates forward along a straight line, without refraction, and exits to the right, as shown in the figure. Here, to facilitate the explanation, the illumination light is represented as a light beam parallel to the optical axis. In the explanation given hereinbelow, the illumination light is also represented as a light beam.

Figure 2:
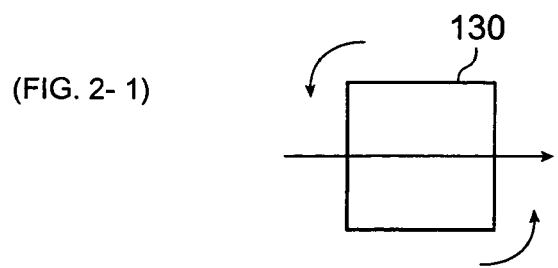
Figure 2:
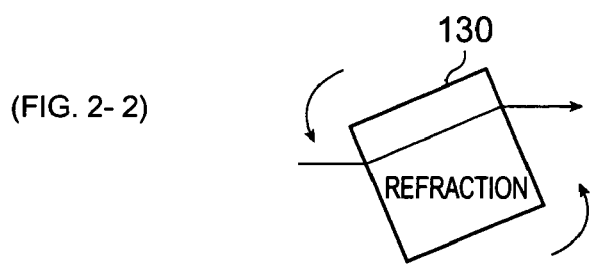
Figure 2:
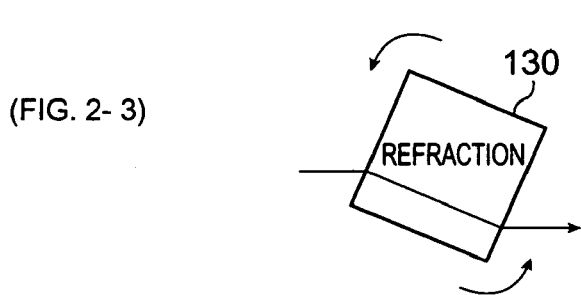
Figure 2:
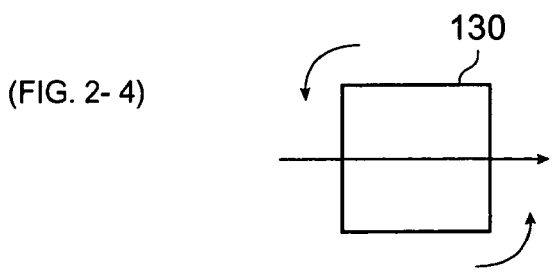

The rotation position of the rotary prism 130 shown in FIG. 2-2 corresponds to counterclockwise rotation through an angle of from 0° to 45° from the rotation position shown in FIG. 2-1. In this case, the illumination light falling on the rotary prism 130 from the left, as shown in the figure, is refracted upward, as shown in the figure, and outgoes to the right, as shown in the figure.

Figure 3:
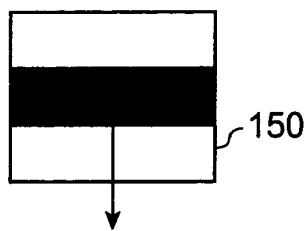
Figure 3:
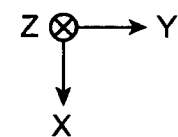
Figure 3:
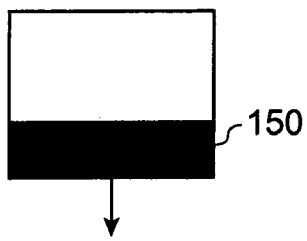
Figure 3:
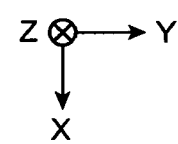
Figure 3:
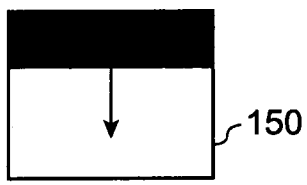
Figure 3:
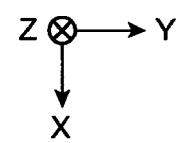
Figure 3:
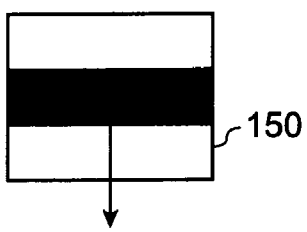
Figure 3:
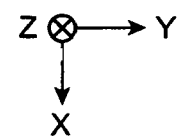
Figure 3:
Figure 3:
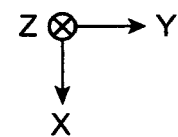

The rotation position of the rotary prism 130 shown in FIG. 2-3 corresponds to counterclockwise rotation through an angle of from 45° to 90° from the rotation position shown in FIG. 2-1. In this case, the illumination light falling on the rotary prism 130 from the left, as shown in the figure, is refracted downward, as shown in the figure, and outgoes to the right, as shown in the figure.

Figure 4:
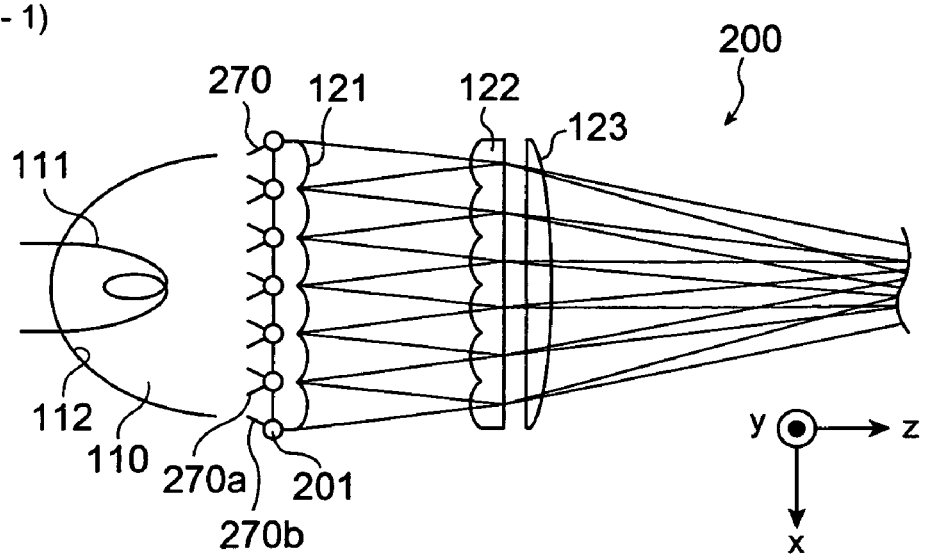
Figure 4:
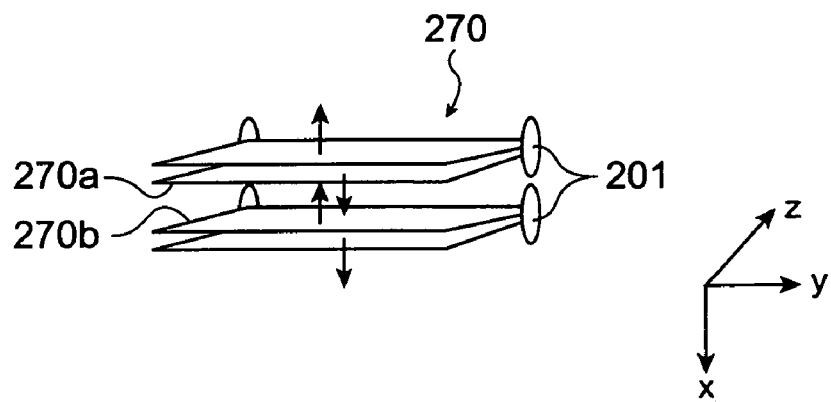

The rotation position of the rotary prism 130 shown in FIG. 2-4 corresponds to counterclockwise rotation through an angle of 90° from the rotation position shown in FIG. 2-1. In this case, similar to the case shown in FIG. 2-1, the illumination light falling on the rotary prism 130 from the left, as shown in the figure, propagates directly forward without refraction, and exits to the right, as shown in the figure. As described above, the illumination light passes through the rotary prism, while the optical axis shifts due to the relationship between the refractive index and rotation of the rotary prism.

Returning to FIG. 1, the rotary prism 130 is disposed in the conjugate plane CNJ onto which the illumination light is superimposed by the superposition lens 123 and parallelizing lens 124. The illumination light that passed through the rotary prism 130 is caused to fall on the irradiated surface 150 by the lenses 141, 142, 143 for image reforming. Because the illumination light is transmitted through the rotary prism 130 in the above-described manner, the illumination light irradiates the irradiated surface 150, while being scanned over the plane.

The scanning pattern of the illumination light over the irradiated surface 150, which changes following the rotation of the rotary prism 130, is shown in FIGS. 3-1 to 3-4.

FIGS. 3-1 to 3-4 show the irradiation region of the illumination light observed when the irradiated surface 150 is irradiated with the illumination light that passed from the rotary prism 130 through the lenses 141, 142, 143 for image reforming according to the patterns shown in FIGS. 2-1 to 2-4. To facilitate the explanation, first, the state in which the illumination light is not cut off with the variable diaphragm 170 will be considered. Because the image is inverted when the light passes through the lenses 141, 142, 143 for image reforming, the scanning direction is also inverted with respect to that shown in FIGS. 2-1 to 2-4 and FIGS. 3-1 to 3-4. Further, when the irradiated surface 150 is continuously irradiated with the illumination light by repeating the operations illustrated by FIGS. 3-1 to 3-4, the pattern of the illumination light integrated over a constant interval is shown in FIG. 3-5.

As shown in FIG. 3-1, when the illumination light is not cut off with the variable diaphragm 170, the illumination light that passed through the rotary prism in the rotation position shown in FIG. 2-1 irradiates the region narrower than the irradiated surface 150, specifically, a portion which is one third of the irradiated surface 150 and located in the center thereof. If the rotary prism is rotated from the position shown in FIG. 2-1 to that shown in FIG. 2-1, then the irradiation region of the illumination light makes a transition to the lower end of the irradiated surface 150 from the center thereof, as shown FIG. 3-1 to FIG. 3-2. Further, if the rotary prism is rotated from the position shown in FIG. 2-2 to that shown in FIG. 2-3, then a transition is made so as to start the irradiation with the illumination light from the upper end of the irradiated surface 150, as shown in FIG. 3-2 to FIG. 3-3. If the rotary prism rotates from the position shown in FIG. 2-3 to that shown in FIG. 2-4, then the irradiation region of the illumination light makes a transition from the upper end toward the center of the irradiated surface 150, as shown in FIG. 3-3 to FIG. 3-4.

Figure 5:
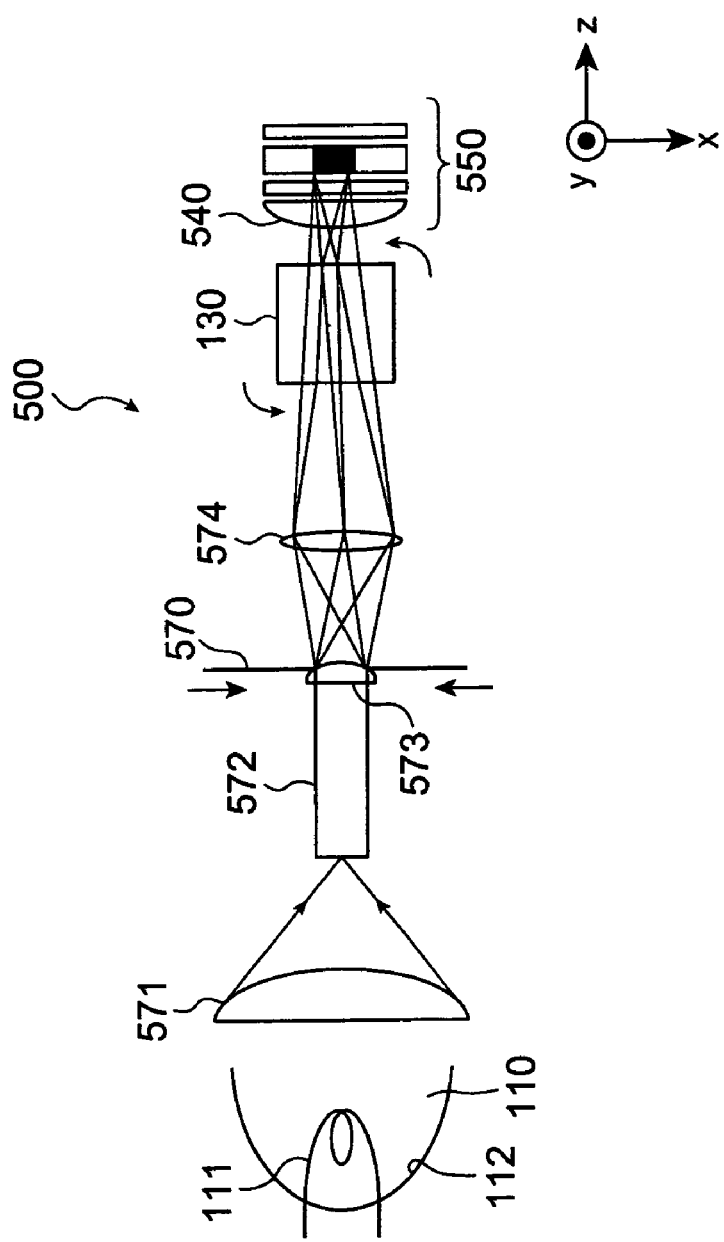

As described above, repeated high-speed scanning of the irradiated surface 150 with the illumination light makes it possible to irradiate the irradiated surface 150 with the illumination light with a uniform illumination intensity distribution, as shown in FIG. 3-5, if integration over a certain fixed interval is conducted. Therefore, even if the illumination light is cut off with the variable diaphragm, an almost rectangular region with uniform illumination intensity distribution can be obtained by merely narrowing the width of the rectangular shape in the ±x direction. As a consequence, the brightness alone can be varied, while conducting irradiation with the illumination light having a uniform illumination intensity distribution, with respect to the region on the irradiated surface which is scanned by the illumination light in a similar manner. Further, if attention is paid to part of the irradiated surface 150, the illumination light sometimes falls thereon and sometimes not. Therefore, a phenomenon identical to intermittent switching occurs. If the configuration of the present exemplary embodiment is considered as an example, the design may be selected such that the irradiation region extends beyond the irradiated surface 150 in the ±x axis direction due to scanning of the illumination light.

Further, an image display device can be composed by disposing a spatial light modulation device in the position of the irradiated surface 150 or in the vicinity thereof in the illumination device 100 of the present exemplary embodiment. For example, a liquid-crystal light valve can be used as the spatial light modulation device. In this case, the image formation region of the liquid-crystal light valve may be almost matched with the irradiated surface 150.

Further, in the present exemplary embodiment, the illumination light was formed in advance to obtain a shape with a lateral/longitudinal ratio of 4:1 with respect to a lateral/longitudinal ratio of the irradiated surface 150 of 4:3. However, the lateral/longitudinal ratio can be freely designed and varied with an optical system and the same effect can be obtained even if the lateral/longitudinal ratio is different from that of the present exemplary embodiment. Therefore, the relationship between the lateral/longitudinal ratios is not limited to that described hereinabove. As a consequence, when the illumination light has a lateral/longitudinal ratio of 4:3, specifically, when the illumination light is not cut off at all, the entire irradiated surface 150 is irradiated, and only the brightness can be varied, while conducting irradiation with the illumination light having a uniform illumination intensity distribution, even if subsequent scanning is conducted by reducing the lateral/longitudinal ratio of the illumination light with the variable diaphragm 170 from that of the state in which scanning has been conducted.

Further, an illumination intensity sensor to detect the illumination intensity of the irradiated surface 150 can be also provided in the illumination device 100. The variable diaphragm 170 is controlled based on the detection results from the illumination intensity sensor. As a result, the illumination intensity of the irradiated surface 150 can be accurately calibrated. Even if there is an effect of the external light, it is possible to control the quantity of light by taking into account the effect of external light. In the present exemplary embodiment, the variable diaphragm 170 cuts off the illumination light from the direction perpendicular to the optical axis, but the illumination light may be also cut off from the direction inclined with respect to the optical axis, without departing from the spirit of the present invention, provided that the axis of the direction in which the illumination light is scanned over the irradiated surface and the axis of the direction in which the variable diaphragm controls the illumination light coincide. Further, in exemplary aspects of the present invention the variable diaphragm 170 cuts off the illumination light from both sides with two shutters having linear edges. But the illumination light may be cut off with any one of the shutters, without departing from the spirit of the present invention, provided that the axis of the direction in which the illumination light is scanned over the irradiated surface and the axis of the direction in which the variable diaphragm controls the illumination light coincide.

Exemplary Embodiment 2

FIG. 4-1 is a schematic of the illumination device 200 of exemplary Embodiment 2, from a light source 110 to a superposition lens 123. The components identical to those of exemplary Embodiment 1 are assigned with the same reference numerals and redundant explanation thereof is omitted.

The relationship between the configuration from the parallelizing lens 124 to the irradiated surface 150 and the xyz system of coordinate is the same as in exemplary Embodiment 1 and is not shown in the figures. In the present exemplary embodiment, the configuration of a variable diaphragm 270 is different from that of the exemplary Embodiment 1. FIG. 4-2 shows a configuration representing a schematic of part of the variable diaphragm 270. The variable diaphragm 270 is composed of a plurality of sets, each set including two shutter blades 270a, 270b that can move about a rotation axis 201 as a center. Further, the two shutter blades 270a, 270b are opened and closed in the up-down direction (direction along the x axis), as shown in FIG. 4-2, about the rotation axis 201 as a center. If the two shutter blades 270a, 270b move so as to approach each other, the light cut-off quantity increases. If the two shutter blades 270a, 270b move so as to withdraw from each other, the amount of transmitted light increases.

Further, the configuration of the variable diaphragm 270 is such that sets of shutter blades 270a, 270b can cut off the light passing through each element of the fly-eye lens 121, those elements being arranged in a row along the y axis direction, as shown in FIG. 4-1. The variable diaphragm 270 is disposed in the vicinity of the fly-eye lens 121. With such a configuration, if the partial luminous fluxes split by the fly-eye lens 121 are cut off with the variable diaphragm 270, then eventually an almost rectangular region with a uniform illumination intensity distribution will be obtained in the region of the irradiated surface which is irradiated with the illumination light by merely reducing the width of the rectangular shape in the ±x axis direction, in the same manner as in exemplary Embodiment 1. Therefore, if the illumination light is scanned along the x axis direction over the irradiated surface, then only the brightness can be varied, while conducting irradiation with the illumination light having a uniform illumination intensity distribution with respect to the region on the irradiated surface which is scanned with the illumination light. Further, in this exemplary embodiment, the variable diaphragm 270 is in the form of sets composed of two shutter blades, but the light can be also cut off with a configuration comprising sets composed of one blade by changing the size of the shutter blade.

Exemplary Embodiment 3

FIG. 5 is a schematic of the image display device 500 of exemplary Embodiment 3 of the present invention. The components identical to those of the above-described exemplary Embodiment 1 are assigned with the same reference symbols and the redundant explanation thereof is omitted. The image display device 500 includes a light source 110, a condensing lens 571, a rod 572, a variable diaphragm 570, image forming lenses 573, 574, a rotary prism 130, a parallelizing lens 540, and a liquid-crystal light valve 550. In the above-described exemplary Embodiment 1, the fly-eye lens and superposition lens were used, but the present exemplary Embodiment 3 is different in that the condensing lens 571, rod 572, and image forming lenses 573, 574 are used and in that the liquid-crystal light valve 550, which is a spatial light modulation device, is disposed in the irradiated surface. The variable diaphragm 570 shuts off the illumination light with the mechanism identical to that of the variable diaphragm of exemplary Embodiment 1.

Referring to FIG. 5, the illumination light emitted from the light source 110 is condensed with the condensing lens 571 and falls on the incidence end portion of the rod 572 in the form of a quadratic prism composed of a glass material. The illumination light exits from the outgoing end portion, while being reflected by the outer walls by using a total-reflection condition of the boundary surface of the outer wall of the rod 572. The shape of the rod 572 is not limited to a quadratic prism shape and the rod can be hollow with a reflecting film formed on the inner surface thereof.

When viewed from the optical axis direction, the outer shape of the outgoing end portion of the rod 572 is formed by changing the ratio of the outer shape of the image forming region of the liquid-crystal light valve 550, which is a spatial light modulation device. Here, the outer shape of the image forming region of the liquid-crystal light valve 550 is a rectangle with a lateral/longitudinal ratio of 4:3 and the outer shape of the outgoing end portion of the rod 572 is a rectangle with a lateral/longitudinal ratio of 4:1.

Because the illumination light outgoing from the rod 572 passes through the image forming lenses 573, 574 and parallelizing lens 540 constituting an image forming lens unit to form the image of the outgoing end portion of the rod 572 on the image formation region of the liquid-crystal light valve 550, if the illumination light is not cut off with the variable diaphragm 570, a portion which is one third of the image formation region will be irradiated with the illumination light with a uniform illumination intensity distribution. Here, the rotary prism 130 as an illumination light scanning device capable of scanning the illumination light over the image formation region is disposed between the rod 572 and the liquid-crystal light valve 550. Therefore, the illumination light passes through the rotary prism 130, while the optical axis shifts due to the relationship between the refractive index and rotation of the rotary prism 130. As a result, similar to the action described in exemplary Embodiment 1, irradiation with the illumination light is conducted at a uniform illumination intensity distribution, while scanning the image formation region of the liquid-crystal light valve 550. Further, the liquid-crystal light valve 550 includes two polarizing plates disposed in front and behind the liquid-crystal light valve and has a structure in which green, blue, and red color filters are orderly disposed for each pixel of a plurality of pixels forming the image formation region of the liquid-crystal light valve 550. Therefore, if the illumination light falling on the image formation region of the liquid-crystal light valve 550 is modulated for each pixel based on electric signals serving as image data, then eventually a full color image can be displayed on the liquid-crystal light valve 550.

In such a configuration, the variable diaphragm 570 is disposed in the vicinity of the rod 572, as shown in FIG. 5.

Therefore, if the partial luminous fluxes emitted from the outgoing end portion of the rod 572 are cut off with the variable diaphragm 570, then eventually an almost rectangular shape with uniform illumination intensity distribution will be obtained in the region of irradiated surface which is irradiated with the illumination light, similar to exemplary Embodiment 1, due to narrowing of the width the rectangular shape in the ±x axis direction. Therefore, if the illumination light is scanned along the x axis direction in the irradiated surface, then only the brightness can be changed, while conducting irradiation with the illumination light with uniform illumination intensity distribution, with respect to the region of the irradiated surface which is scanned with the illumination light. Further, when a plurality of image forming lenses are combined and a conjugate plane of the outgoing end surface is newly formed between the outgoing end surface and the liquid-crystal light valve 550, then the same effect can be also obtained with the configuration in which the variable diaphragm 570 is disposed in the conjugate plane of the outgoing end surface or in the vicinity of the conjugate plane of the outgoing end surface, rather than in the vicinity of the outgoing end surface as in the present configuration.

Further, in the present exemplary embodiment, the lateral/longitudinal ratio of the outer shape in the image formation region of the liquid-crystal light valve 550 was 4:3, whereas the illumination light was shaped in advance to a lateral/longitudinal ratio of 4:1. However, the lateral/longitudinal ratio can be freely designed and changed with the optical system and the same effect can be obtained even when the lateral/longitudinal ratio is different from that of the present exemplary embodiment. Therefore, the lateral/longitudinal ratio is not limiting. For example, when the illumination light has a lateral/longitudinal ratio of 4:3, that is, when the illumination light is not cut off at all, then the entire image formation region of the liquid-crystal light valve 550 is irradiated, and only the brightness can be varied, while conducting irradiation with the illumination light with a uniform illumination intensity distribution, even if subsequent scanning is conducted by reducing the lateral/longitudinal ratio of the illumination light with the variable diaphragm 170 from that of the state in which scanning has been conducted.

As described hereinabove, in exemplary Embodiment 3, there is provided a image display device including an illumination device in which only the brightness can be varied, while conducting irradiation with the illumination light having a uniform illumination intensity distribution, as an effect identical to that of exemplary Embodiment 1.

Therefore, in the present exemplary embodiment the dynamic range of displayed images can be expanded by conducting control by increasing or decreasing the quantity of the illumination light with the variable diaphragm 570. Here, a specific example of expanding the dynamic range will be explained in a simple manner. For example, let us consider the case in which a completely dark image is determined based on the average luminosity and histogram of brightness of each pixel in a certain image. In this case, it is not necessary to represent accurate gradation close to the white level. Therefore, the quantity of the illumination light is reduced by decreasing the aperture of the variable diaphragm 570 and a gamma characteristic is varied so as to increase the gradation representation of the black level. As a result, the representation characteristic in the region close to the black level can be enhanced and the dynamic range can be expanded.

Conversely, there are also cases where a completely bright image is determined based on the average luminosity and histogram of brightness of each pixel in a certain image. In this case, it is not necessary to represent accurate gradation close to the black level. In this case, the quantity of the illumination light is increased by opening the variable diaphragm 570 and a gamma characteristic is varied so as to increase the gradation representation of the white level. As a result, the representation characteristic in the region close to the white level can be enhanced and the dynamic range can be expanded.

Further, in the present exemplary embodiment, illumination with a uniform illumination intensity distribution is instantaneously conducted on portion of the image formation region of the liquid-crystal light valve 550, which is a spatial light modulation device, with the illumination device 100. As described hereinabove, within a certain time interval, the illumination light can be scanned over the image formation region with the rotary prism 130 which is illumination light scanning means. Therefore, irradiation with the illumination light with a uniform illumination intensity distribution is conducted over the entire image formation region. As a result, when a viewer looks directly at the liquid-crystal light valve 550, the viewer can recognize the image. Further, if attention is paid to part of the image formation region, the illumination light sometimes falls thereon and sometimes not. Therefore, a phenomenon identical to intermittent switching occurs. For this reason, though the spatial light modulator is of a hold type, it can display a vivid dynamic image. The same effect can be also obtained with respect to an image display device in which a spatial light modulation element, such as a liquid-crystal light valve, is combined with the illumination device of exemplary Embodiment 1 or exemplary Embodiment 2. In this case, the write direction of electric signals serving as image data for the liquid-crystal light valve 550 may coincide with the direction of scanning the illumination light. Furthermore, the write period of electric signals serving as image data and the scanning period may be almost the same and that light illumination be conducted after the image data has been fully written.

Further, an optical sensor to detect at least one of the illumination intensity and chromaticity of the liquid-crystal light valve 550, which is an irradiated surface, can be also provided in the image display device 500. The drive of the variable diaphragm 170 or liquid-crystal light valve 550 is controlled based on the detection results from the optical sensor. As a result, the illumination intensity or chromaticity of the irradiated surface 150 can be accurately calibrated. Furthermore, even if there is an effect of the external light, it is possible to control the quantity of light by taking into account the effect of external light.

The reflection factor of the surface on the outgoing side (side of the liquid-crystal light valve 550) may be reduced with respect to the reflection factor of the surface on the incidence side (side of the light source 110) of the illumination light in the variable diaphragm 570. For example, a mirror surface is formed on the surface of the variable diaphragm 570 on the illumination light incidence side. A black coating is applied to the surface of the variable diaphragm 570 on the illumination light outgoing side. As a result, even when the light that passed through the variable diaphragm 570 returns to the variable diaphragm 570 as a return light, because it falls on the black coated surface, the occurrence of stray light can be reduced. Furthermore, because the light is reflected by the incidence side surface, the absorption of heat can be inhibited. Therefore, the variable diaphragm can be easily prevented from being deformed by heat.

Exemplary Embodiment 4

Figure 6:
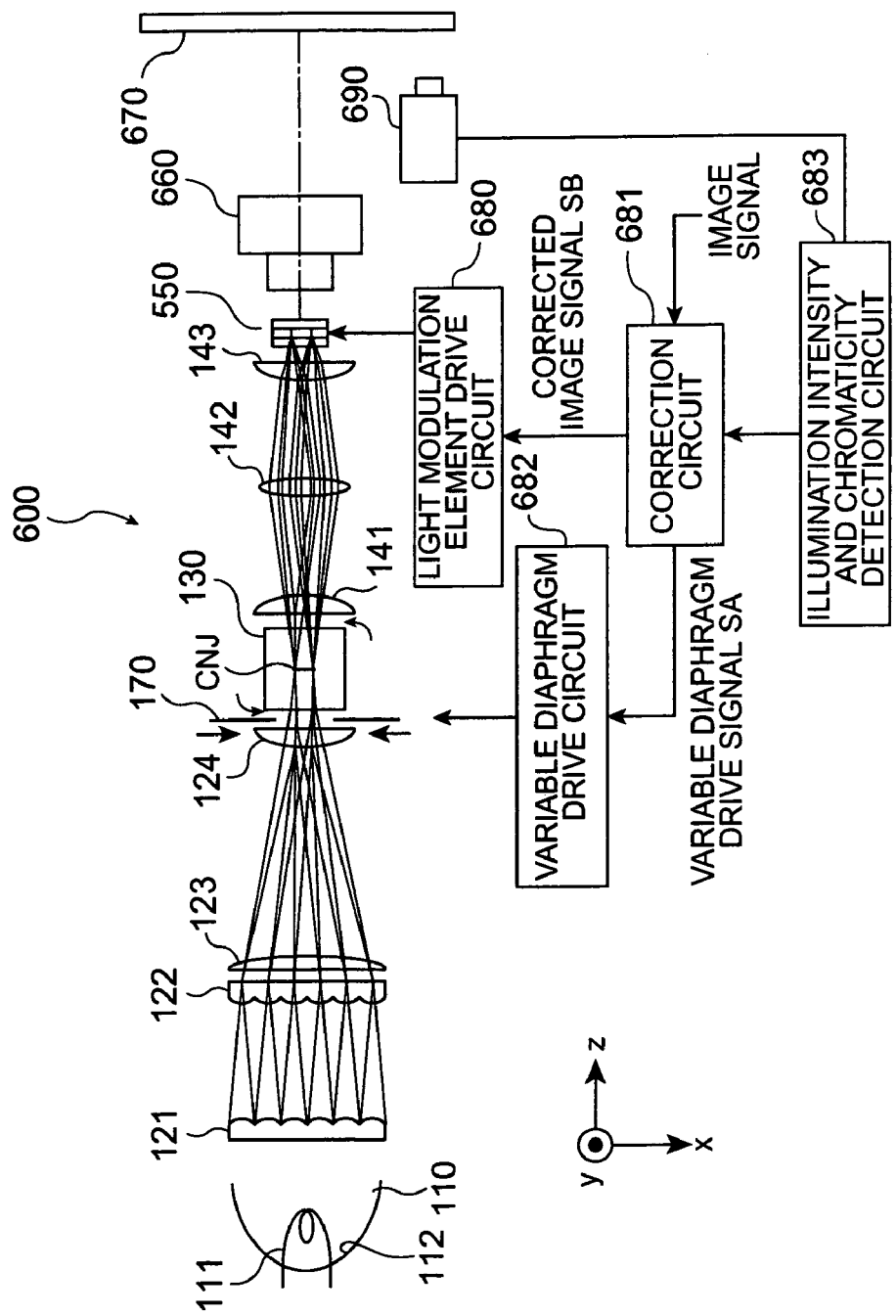
FIG. 6 is a schematic of the projector of exemplary Embodiment 4.

FIG. 6 is a schematic of a projector 600 of exemplary Embodiment 4 of the present invention. The components identical to those of the above-described exemplary embodiments are assigned with the same symbols and the redundant explanation thereof is omitted. In the projector 600 of the present exemplary embodiment, the configuration from the light source 110 to the lens 143 for image reforming is identical to that of exemplary Embodiment 1. Further, the position of the irradiated surface 150 and the image formation region of the liquid-crystal light valve 550, which is the spatial light modulation device, are selected so as to match each other. The liquid-crystal light valve 550 modulates the illumination light according to the image signals. The modulated light is enlarged and projected on a screen 670 with a projection lens 660 serving as a projection device.

The projection system of the present exemplary embodiment may be a system in which projection is conducted from the front surface of the screen 670 or a system in which projection is conducted from the rear surface of the screen 670. The projection device may use a curved mirror, rather than a lens such as the projection lens 660.

In the present exemplary embodiment, the dynamic range of the display image can be expanded by controlling the quantity of the illumination light with the variable diaphragm 170 according to the image signals, as described in the aforementioned exemplary Embodiment 3. Furthermore, in addition to increasing or decreasing the quantity of the illumination light according to the image signals, the quantity of the illumination light can be also controlled according to the usage environment, so that the quantity of light is fixed within a long interval. For example, in a dark environment of special shows, the brightness can be adjusted and fixed so as to avoid unnecessary bright images. Furthermore, the brightness can be also adjusted and fixed when the image brightness differs according to the screen size in case the size of the projection screen is varied by zooming the projection distance or projection lens.

Further, the rotary prism 130 scans the rectangular illumination light over the image formation region of the liquid-crystal light valve 550. For this reason, similar to exemplary Embodiment 3, if attention is paid to part of the image formation region, the illumination light sometimes falls thereon and sometimes not and, therefore, a phenomenon identical to intermittent switching occurs. For this reason, though the spatial light modulator is of a hold type, such as a liquid-crystal light valve 550, it can display a vivid dynamic image. As a consequence, the display characteristic of dynamic images can be enhanced.

Figure 7:
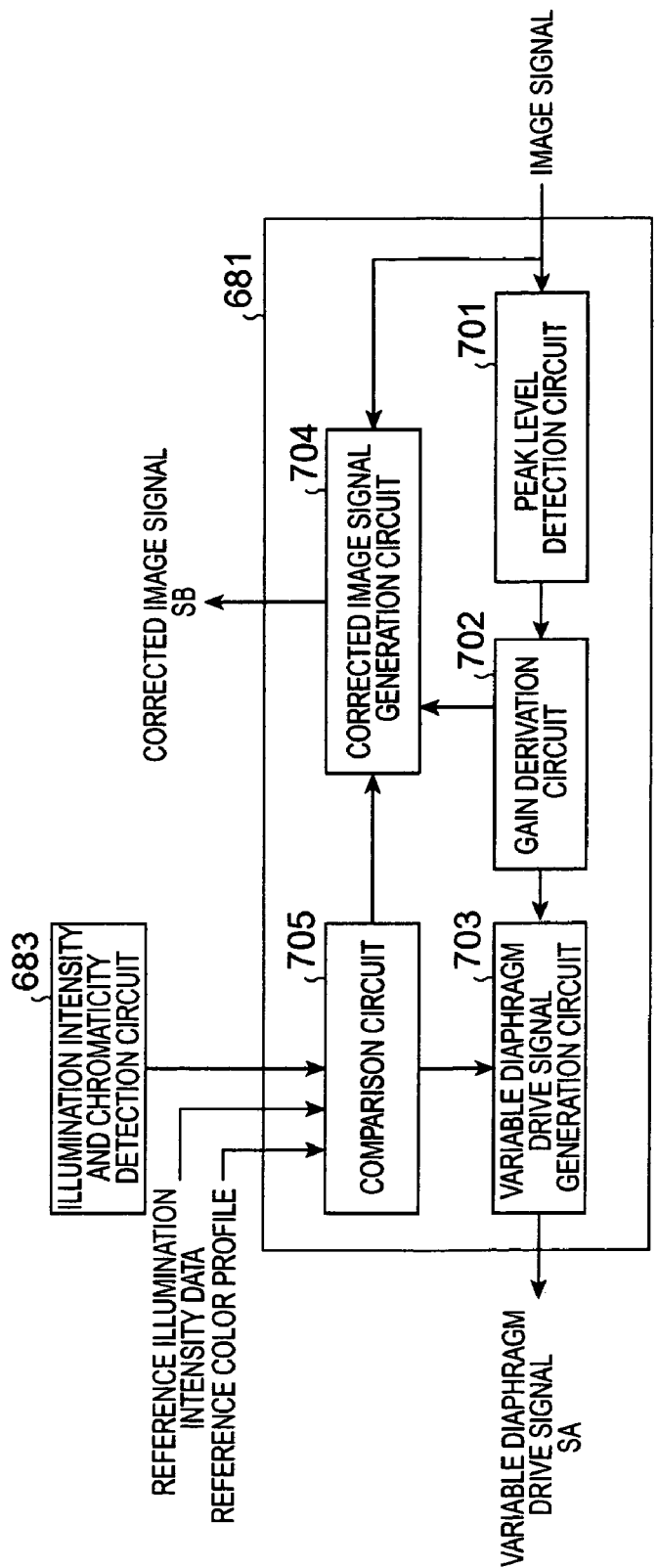
FIG. 7 is a schematic of the correction circuit.

A procedure of increasing the dynamic range by changing the quantity of illumination light by controlling the variable diaphragm 170 will be explained below. An image signal from an external device (not shown in the figure) connected to the projector 600 is input into a correction circuit 681. The correction circuit 681, as shown in FIG. 7, includes a peak level detection circuit 701, a gain derivation circuit 702, a variable diaphragm drive signal generation circuit 703, a corrected image signal generation circuit 704, and a comparison circuit 705. The peak level detection circuit 701 detects a peak level of luminosity per 1 frame in the inputted image signal. The gain derivation circuit 702 derives a gain based on the detected peak level. For example, let us consider a case where a peak level in the input image signal is 10% of the maximum white level. In this case, the gain derivation circuit 702 derives a gain equal to 0.1. The variable diaphragm drive signal generation circuit 703 generates a variable diaphragm derive signal SA based on the derived gain.

For example, when the gain is 0.1, the variable diaphragm drive signal SA is generated so as to drive the variable diaphragm 170 so as to reduce the quantity of the illumination light to about 1/10. A computation table to generate the variable diaphragm drive signal SA is stored in advance in a memory (not shown in the figure). The variable diaphragm drive signal generation circuit 682 drives the variable diaphragm 170 based on the variable diaphragm drive signal SA and controls the quantity of the illumination light.

Further, the gain from the gain derivation circuit 702 and the original image signal are input into the corrected image signal generation circuit 704. The corrected image signal generation circuit 704 corrects the original image signal based on the gain. For example when the gain is 0.1, the corrected image signal generation circuit 704 multiplies the level of the image signal by about 10 and generates the corrected image signal SB.

Returning to FIG. 6, the light modulation element drive circuit 680 drives the liquid-crystal light valve 550 based on the corrected image signal SB. With such a circuit configuration, the gradation of the displayed image can be controlled by using both the quantity of the illumination light and the liquid-crystal light valve 550. As a result, the representation region of gradation close to the black level can be expanded in the image display device, while maintaining the gradation in the vicinity of the white level. Therefore, the dynamic range of the projected image can be increased.

Furthermore, the projector 600 includes an optical sensor 690, such as a photodiode or two-dimensional CCD. The optical sensor 690 detects at least one of the illumination intensity (luminosity information) and chromaticity (color information) of the image projected on the screen 670. In the present exemplary embodiment, both the illumination intensity and the chromaticity are detected. The illumination intensity and chromaticity detected by the optical sensor 690 are inputted into the illumination intensity and chromaticity detection circuit 683.

As for the illumination intensity, the comparison circuit 705 located in the correction circuit 681 compares the detected illumination intensity with the reference illumination intensity data that were stored in advance. For example, the effect of external light is determined based on the comparison results. For example, when a decision is made that there is little external light, the variable diaphragm 170 reduces the quantity of the illumination light, suppresses the so called black floating effect, and makes it possible to obtain a sharp image. Here, the black floating effect represents the appearance of leak light during black display when a liquid-crystal light valve is used. Furthermore, when a decision is made that there is too much external light, the variable diaphragm 170 increases the quantity of the illumination light to an optimum level to prevent the projected image from being destroyed by the external light. In this case, the correction circuit 681 also changes the gamma characteristic.

As for the chromaticity, the calibration of color information can be conducted by comparing the detected chromaticity with the reference color data that were stored in advance. For the calibration, for example, only red color light is projected on the screen 670 and chromaticity is detected with the optical sensor 690. Further, the chromaticity of the detected red color light is compared with the reference color profile of the red color light that was stored in advance. The comparison results are feedback returned to drive the variable diaphragm 170 and liquid-crystal light valve 550. The calibration is similarly conducted with respect to green color light and blue color light. As a result, a high-quality full-color image can be obtained. The calibration can thus be conducted based on the illumination intensity or chromaticity detected with the optical sensor 690. Therefore, when the external light is not white or when the screen is not white, it is possible to reproduce the colors estimated by comparing the reference illumination intensity data with the below-described reference color profile.

Further, in the correction circuit 681, a bright/dark image discrimination circuit can be provided instead of the peak level detection circuit 701. The bright/dark image discrimination circuit computes an average luminosity or a brightness histogram of each pixel in one frame of the inputted image signal. Further, the bright/dark image discrimination circuit discriminates the entire bright/dark balance of the image. Actually, the discrimination can be conducted based on any one data from the histogram and average luminosity. An example of discriminating the bright/dark balance of the image by the histogram or average luminosity is described below. A white level of 100% means a maximum white luminosity that can be displayed.

Example of Discrimination Based on Histogram (1) When the white level is 90% or more and occupies 50% or more of the entire screen . . . especially bright.

(2) When the white level is 75% or more and occupies 50% or more of the entire screen . . . somewhat bright.

(3) When the white level is 25% or less and occupies 50% or more of the entire screen . . . somewhat dark.

(4) When the white level is 10% or less and occupies 50% or more of the entire screen . . . especially dark.

(5) When none of the conditions (1)-(4) is satisfied . . . average brightness.

Example of Discrimination Based on Average Luminosity (6) When the average white level is 80% or more of the white level . . . especially bright.

(7) When the average white level is 60% or more of the white level . . . somewhat bright.

(8) When the average white level is 40% or less of the white level . . . somewhat dark.

(9) When the average white level is 20% or less of the white level . . . especially dark.

(10) When none of the conditions (6)-(9) is satisfied . . . average brightness.

Further, the gain derivation circuit 702 derives the gain according to the predetermined settings. For example, the relationship between the gain and the discrimination results of the entire image of the bright/dark image discrimination circuit is presented below.

Relationship Between Discrimination Results and Gain

When especially bright . . . gain=1.0.
When somewhat bright . . . gain=0.9.
In case of average brightness . . . gain=0.8.
When somewhat dark . . . gain=0.7.
When especially dark . . . gain=0.6.

The above-described variable diaphragm control processing is conducted based on the gain that was thus set. Further, when the entire screen is bright (the gain is high), a correction image signal SB may be generated so as to vary the gamma characteristic so as to increase the gradation representation of the white level. Moreover, when the entire screen is dark (the gain is low), a correction image signal SB is generated so as to vary the gamma characteristic so as to increase the gradation representation of the black level.

As for the circuit configuration or optical sensor of the present exemplary embodiment, the same effect can be obtained if they are appropriately combined with an image display device in which a spatial optical modulation element, such as a liquid-crystal light valve, is combined with the illumination device of exemplary Embodiment 1 or exemplary Embodiment 2, or if they are combined with a projector in which a projection lens serving as a projection device is further combined with those image display devices or the image display device of exemplary Embodiment 3.

Exemplary Embodiment 5

In the below-described exemplary embodiment, the components identical to those of the above-described exemplary embodiments are assigned with the same reference numerals and the explanation of common operations or actions is omitted. Furthermore, when the same names are assigned, because the functions are almost identical even if the reference numerals are different, basic explanation is omitted.

Figure 8:
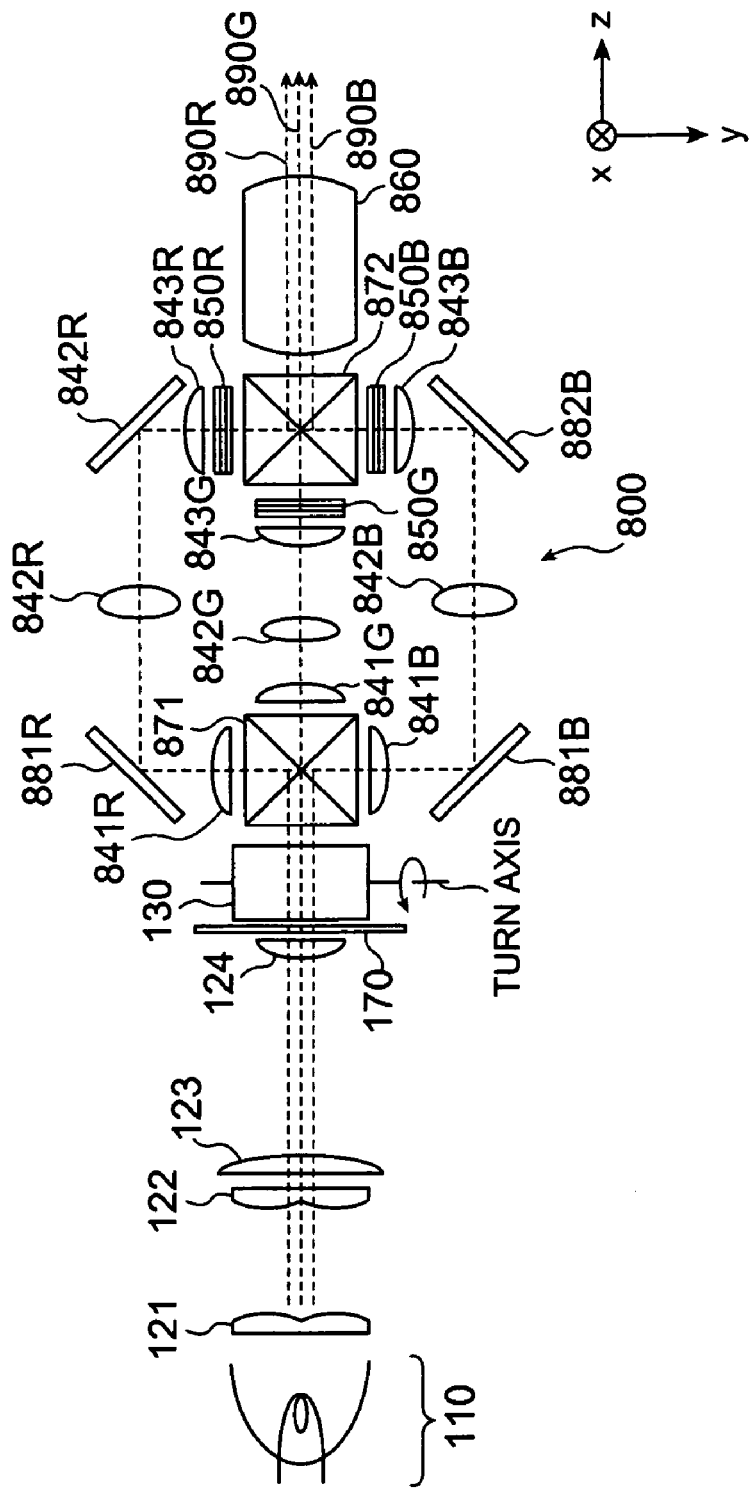
FIG. 8 is a schematic of the projector of exemplary Embodiment 5.

FIG. 8 is a schematic of the projector 800 in exemplary Embodiment 5 of the present invention. The projector 800 includes a light source 110, fly-eye lenses 121, 122, a superposition lens 123, a parallelizing lens 124, a variable diaphragm 170, a rotary prism 130, a dichroic prism 871 for color separation, reflecting mirrors 881R, 882R, 881B, 882B, lenses for image reforming 841R, 842R, 843R, 841G, 842G, 843G, 841B, 842B, 843B, liquid-crystal light valves 850R, 850G, 850B, a dichroic prism 872 for color synthesis, and a projecting lens 860. To simplify the explanation, the display will be conducted with color lights obtained by color separation of the components of the illumination light emitted from the light source and each color light will be denoted in the figure by a light beam parallel to the optical axis.

First, the illumination light emitted from the light source 110 passes through the fly-eye lenses 121, 122 and superposition lens 123. The microlenses of the fly-eye lenses 121, 122 are molded to have the outer shape with a ratio changed with respect to that of the outer shape of the image formation region of the liquid-crystal light valves 850R, 850G, 850B, which are the spatial light modulation devices, when viewed from the optical axis direction. Here, the outer shape of the image formation region of the liquid-crystal light valves 850R, 850G, 850B is a rectangle with a lateral/longitudinal ratio of 4:3, and the outer shape of microlenses of the fly-eye lens 121 is a rectangle with a lateral/longitudinal ratio of 4:1. The superposition lens 123 condenses a plurality of split partial lights and forms inside the rotary prism 130 the image established by the outer shape of the microlenses of the fly-eye lens 121 via the parallelizing lens 124. Further, the configuration from the light source to the rotary prism in FIG. 8 is identical to that shown in FIG. 1, the difference therebetween being in that the former configuration is viewed from the direction rotated through 90 degrees about the optical axis as a rotation axis.

A variable diaphragm 170 is provided in the vicinity of the rotary prism 130 on the side of the light source 110. The projector 800 has an optical sensor 690 (not shown in the figure) and a correction circuit 681 (not shown in the figure) identical to those of exemplary Embodiment 4. As a result, the variable diaphragm 170 can be driven by the variable diaphragm drive signal SA described in exemplary Embodiment 4. Further, liquid-crystal light valves 850R, 850G, 850B are driven based on the corrected image signals SB.

The illumination light that has a quantity of light controlled by the variable diaphragm 170 and passed through the rotary prism 130 falls on the dichroic prism 871 for color separation. The dichroic prism 871 for color separation is composed by pasting together four triangular prisms. An optical multilayer film reflecting the red color light and transmitting the green color light and a multilayer optical film reflecting the blue color light and transmitting the green color light are formed on the pasted surfaces. As a result, the dichroic prism 871 for color separation has a function of separating the incident illumination light into the red color light, green color light, and blue color light and emitting them separately from three directions. As a result, the illumination light falling on the dichroic prism 871 for color separation is separated into a red color light 890R, green color light 890G, and blue color light 890B. As a result, after passing through the rotary prism 130, which is illumination light scanning means, the light is separated into at least two color lights. The dichroic prism for color separation may be replaced with another optical component in the form of crossed glass plates having similar optical multilayer films, this component having a similar color separation function.

First, the red color light 890R is guided by the reflecting mirrors 881R, 882R and lenses 841R, 842R, 843R for image reforming to the liquid-crystal light valve 850R. In this process, the lenses 841R, 842R, 843R for image reforming, form on the liquid-crystal light valve 850R, which is a display element, the image that was formed by the fly-eye lenses 121, 122, superposition lens 123, and parallelizing lens 124, which are the image forming device.

Further, the green color light 890G is guided by the lenses 841G, 842G, 843G for image reforming to the liquid-crystal light valve 850G. In this process, the lenses 841G, 842G, 843G for image reforming form on the liquid-crystal light valve 850G, which is a display element, the image that was formed by the fly-eye lenses 121, 122, superposition lens 123, and parallelizing lens 124, which are the image forming device.

Further, the blue color light 890B is guided by the reflecting mirrors 881B, 882B and lenses 841B, 842B, 843B for image reforming to the liquid-crystal light valve 850B. In this process, the lenses 841B, 842B, 843B for image reforming, form on the liquid-crystal light valve 850B, which is a display element, the image that was formed by the fly-eye lenses 121, 122, superposition lens 123, and parallelizing lens 124, which are the image forming device.

As a result, if the variable diaphragm 170 does not cut off the illumination light, the image formation regions of liquid-crystal light valves 850R, 850G, 850B can be irradiated with an illumination light with an almost uniform illumination intensity distribution in the portion which is one third of the image formation region, similarly to exemplary Embodiment 1. Further, because the rotary prism 130 is disposed as the illumination light scanning device, the illumination light passes through the rotary prism 130, while the optical axis is shifted due to the relationship between the refractive index and rotation of the rotary prism 130. For this reason, each color light obtained by color separation uniformly irradiates the entire image formation region, while scanning over the entire image formation region of respective liquid-crystal light valves 850R, 850G, 850B. Therefore, repeatedly conducting high-speed scanning of the illumination light over the image formation region of the liquid-crystal light valves 850R, 850G, 850B makes it possible to irradiate the inside of the image formation region with the illumination light with a uniform illumination intensity distribution, if integration over a certain fixed interval is conducted. Further, if attention is paid to part of the image formation region, the illumination light sometimes falls thereon and sometimes not and, therefore, a phenomenon identical to intermittent switching occurs.

Further, the illumination light of each color that falls on the image formation region of the liquid-crystal light valves 850R, 850G, 850B is modulated based on the electric signal in the image formation region of the liquid-crystal light valves 850R, 850G, 850B and guided in the direction of the projection lens 860, which is the projection device, with the dichroic prism 872 for color synthesis. The dichroic prism 872 is composed by pasting together four triangular prisms. An optical multilayer film reflecting the red color light and transmitting the green color light and a multilayer optical film reflecting the blue color light and transmitting the green color light are formed on the pasted surfaces. As a result, the dichroic prism has a function of synthesizing the red color light, green color light, and blue color light falling from three directions and emitting the synthesized light toward the projection lens 860.

Further, the liquid-crystal light valves 850R, 850G, 850B have a structure including two polarizing plates disposed in front and behind the liquid-crystal light valve, but the red, green, and blue color filters are not specifically disposed for each pixel, as in exemplary Embodiment 3.

Further, the illumination light falling on the projection lens 860 is projected onto a screen (not shown in the figure) and an image is displayed on the screen. At this time, the images of liquid-crystal light valves 850R, 850G, 850B that have modulated the red color light, green color light, and blue color light are displayed with superposition on the screen. Therefore, a full-color display is possible. Furthermore, the positions of images corresponding to each color light that were formed by the group of lenses for image reforming in the image projected onto the screen almost coincide. The scanning directions of the images corresponding to each color light also coincide.

Further, the axis of the direction in which the illumination light is scanned in the liquid-crystal light valves 850R, 850G, 850B, which are the irradiated surfaces, and the axis (direction along the x axis in FIG. 8) of the direction in which the variable diaphragm 170 controls the illumination light coincide. Further, the variable diaphragm 170 cuts off the illumination light almost linearly from at least one direction. In the present exemplary embodiment, the variable diaphragm 170 is a mechanism to cut off the illumination light from the ±x direction. Therefore, if the light is cut off with the variable diaphragm 170, eventually an almost rectangular region with a uniform illumination intensity distribution will be obtained in the region of the irradiated surface which is irradiated with the illumination light by merely reducing the width of the rectangular shape in the ±x axis direction, in the same manner as in exemplary Embodiment 1. Therefore, if the illumination light is scanned along the x axis direction over the irradiated surface, then only the brightness can be varied, while conducting irradiation with the illumination light having a uniform illumination intensity distribution with respect to the region on the irradiated surface which is scanned with the illumination light. Further, in this exemplary embodiment, the conjugate surfaces of liquid-crystal light valves 850R, 850G, 850B are almost in a central position of the rotary prism 130. Therefore, the variable diaphragm 170 is provided in the space of the rotary prism 130, which is in the vicinity of the conjugate surfaces, on the side of the light source 110, but the same effect can be obtained by disposing the variable diaphragm 170 in the position of the conjugate surface by changing the design of the optical system. Furthermore, the same effect can be obtained with a configuration in which the variable diaphragm of exemplary Embodiment 2 is disposed instead of the variable diaphragm 170.

As described hereinabove, with exemplary Embodiment 5, there is provided a dichroic prism 871 for color separation, which is a color separation optical system to separate the illumination light that passed through the variable diaphragm 170 into at least two illumination lights. As a result, it is possible to realize at least one projector in which the dynamic image quality is greatly enhanced, few restrictions are placed on the light source, the light utilization efficiency is high, and a full-color image with a wide dynamic range can be displayed due to the operation of at least one variable diaphragm 170.

Exemplary Embodiment 6

In the below-described exemplary embodiment, the components identical to those of the above-described exemplary embodiments are assigned with the same reference numerals and the explanation of common operations or actions is omitted. Furthermore, when the same names are assigned, because the functions are almost identical even if the reference numerals are different, basic explanation is omitted.

Figure 9:
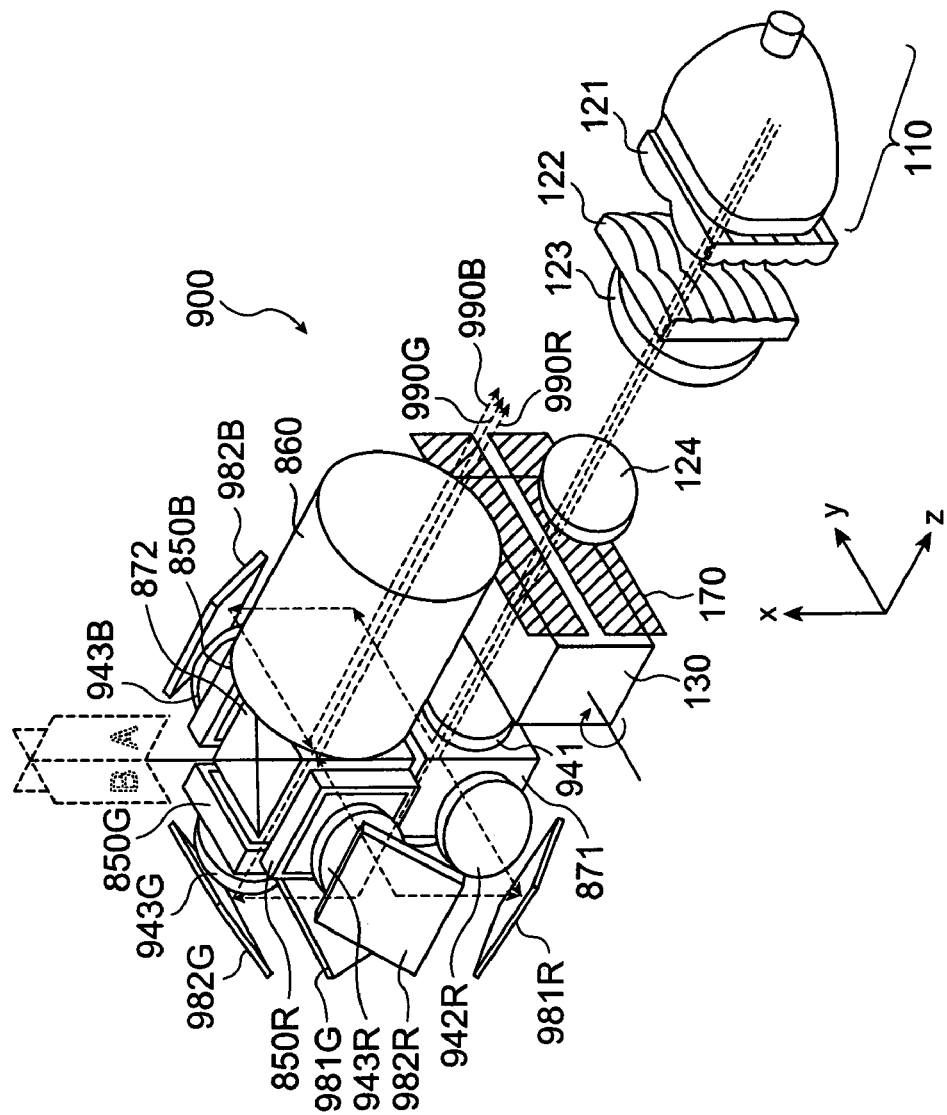
FIG. 9 is a schematic configuration of the projector of exemplary Embodiment 6.

FIG. 9 is a schematic of a projector 900 of exemplary Embodiment 6 in accordance with an exemplary aspect of the present invention. The projector 900 includes a light source lamp 110, fly-eye lenses 121, 122, a superposition lens 123, a parallelizing lens 124, a variable diaphragm 170, a rotary prism 130, a dichroic prism 871 for color separation, reflecting mirrors 981R, 982R, 981G, 982G, 981B, 982B, lenses for image reforming 941, 942R, 943R, 942G, 943G, 942B, 943B, liquid-crystal light valves 850R, 850G, 850B, a dichroic prism 872 for color synthesis, and a projecting lens 860.

Exemplary Embodiment 6 differs significantly from exemplary Embodiment 5 in that it has an up-down stack configuration such that the axis where the color separation places of the dichroic prism 871 for color separation cross each other and the crossing axis of the dichroic prism 872 for color synthesis are disposed on the same axis and in that some of the lenses for image reforming that were disposed for each color light are jointly used.

Figure 10:
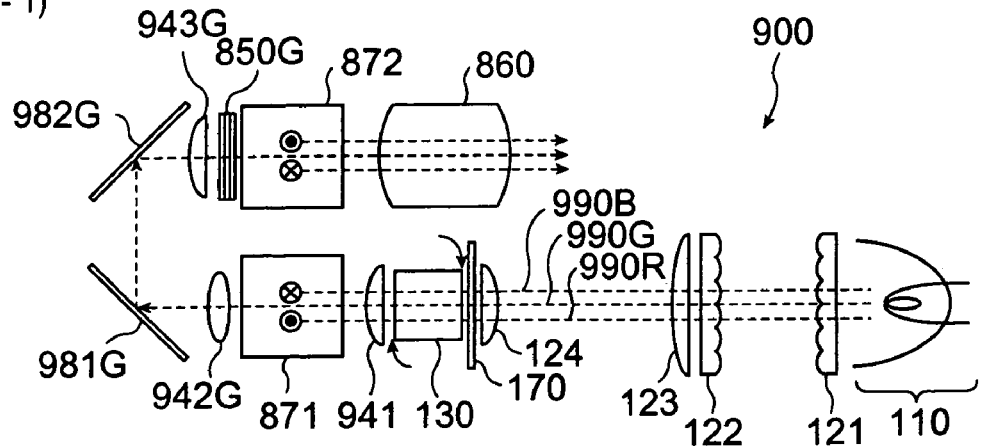
Figure 10:
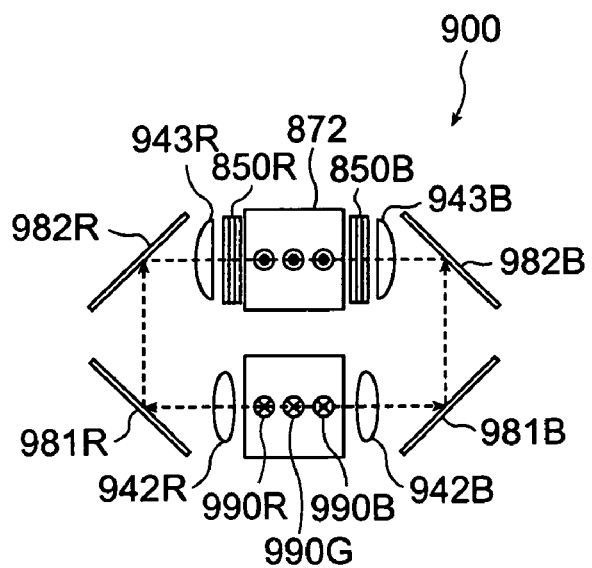

The configuration of the projector 900 will be described below in greater detail by using FIGS. 10-1 and 10-2. FIG. 10-1 is a schematic of projector 900 with the plane containing plane A shown in FIG. 9 serving as a reference. FIG. 10-2 is a schematic view of projector 900 with the plane containing plane B shown in FIG. 9 serving as a reference. Further, to simplify the explanation, the display will be conducted with color lights obtained by color separation of the components of the illumination light emitted from the light source and each color light will be denoted in the figure by a light beam parallel to the optical axis.

First, the illumination light emitted from the light source 110 passes through the fly-eye lenses 121, 122 and superposition lens 123. The microlenses of the fly-eye lenses 121, 122 are molded to have the outer shape with a ratio changed with respect to that of the outer shape of the image formation region of the liquid-crystal light valves 850R, 850G, 850B, which are the spatial light modulation devices, when viewed from the optical axis direction. Here, the outer shape of the image formation region of the liquid-crystal light valves 850R, 850G, 850B is a rectangle with a lateral/longitudinal ratio of 4:3, and the outer shape of microlenses of the fly-eye lens 121 is a rectangle with a lateral/longitudinal ratio of 4:1. The superposition lens 123 condenses a plurality of split partial lights and forms inside the rotary prism 130 the image established by the outer shape of the microlenses of the fly-eye lens 121 via the parallelizing lens 124.

Further, there is provided a dichroic prism 871 for color separation, which is a color separation optical system to separate the illumination light that passed through the variable diaphragm 170 into illumination lights of at least two colors. As a result, a high-quality full-color image with a wide dynamic range can be obtained with at least one variable diaphragm 170.

The illumination light that passed through the rotary prism 130 falls on the color separation dichroic prism 871 via the lens 941 for image reforming. The illumination light that fell on the dichroic prism 871 for color separation is separated into a red color light 990R, green color light 990G, and blue color light 990B.

The red color light 990R is guided to the liquid-crystal light valve 850R along an almost U-like optical path by the reflecting mirrors 981R, 982R and lenses 942R, 943R for image reforming. At this time, the lenses 941R, 942R, 943R for image reforming form the image formed by the fly-eye lenses 121, 122, superposition lens 123, and parallelizing lens 124, which are the image forming device, on the liquid-crystal light valve 850R which is a display element.

The green color light 990G is guided to the liquid-crystal light valve 850G along an almost U-like optical path by the reflecting mirrors 981G, 982G and lenses 942G, 943G for image reforming. At this time, the lenses 941, 942G, 943G for image reforming, form the image formed by the fly-eye lenses 121, 122, superposition lens 123, and parallelizing lens 124, which are the image forming means, on the liquid-crystal light valve 850G which is a display element.

The blue color light 990B is guided to the liquid-crystal light valve 850B along an almost U-like optical path by the reflecting mirrors 981B, 982B and lenses 942B, 943B for image reforming. At this time, the lenses 941, 942B, 943B for image reforming form the image formed by the fly-eye lenses 121, 122, superposition lens 123, and parallelizing lens 124, which are the image forming means, on the liquid-crystal light valve 850G which is a display element.

As a result, if the variable diaphragm 170 does not cut off the illumination light, the image formation regions of liquid-crystal light valves 850R, 850G, 850B can be irradiated with an illumination light with an almost uniform illumination intensity distribution in the portion which is one third of the image formation region, similarly to exemplary Embodiment 1. Further, the rotary prism 130 is disposed as the illumination light scanning device. Therefore, the illumination light passes through the rotary prism 130, while the optical axis is shifted due to the relationship between the refractive index and rotation of the rotary prism 130. For this reason, each color light obtained by color separation uniformly irradiates the entire image formation region, while scanning over the entire image formation region of respective liquid-crystal light valves 850R, 850G, 850B. Therefore, repeatedly conducting high-speed scanning of the illumination light over the image formation region of the liquid-crystal light valves 850R, 850G, 850B makes it possible to irradiate the inside of the image formation region with the illumination light with a uniform illumination intensity distribution, if integration over a certain fixed interval is conducted. Further, if the attention is paid to part of the image formation region, the illumination light sometimes falls thereon and sometimes not and, therefore, a phenomenon identical to intermittent switching occurs.

Returning to FIG. 9, the illumination light of each color that fell on the image formation regions of the liquid-crystal light valves 850R, 850G, 850B is modulated based on the electric signal in the image formation regions of the liquid-crystal light valves 850R, 850G, 850B and guided in the direction of the projection lens 860, which is the projection device, with the dichroic prism 872 for color synthesis.

Further, the illumination light falling on the projection lens 860 is projected onto a screen (not shown in the figure) and an image is displayed on the screen. At this time, the images of liquid-crystal light valves 850R, 850G, 850B that have modulated the red color light, green color light, and blue color light are displayed with superposition on the screen. Therefore, a full-color display is possible. Furthermore, the positions of images corresponding to each color light that were formed by the group of lenses for image reforming in the image projected onto the screen coincide with each other. Specifically, the scanning directions of the images corresponding to each color light also coincide.

Further, the axis of the direction in which the illumination light is scanned in the liquid-crystal light valves 850R, 850G, 850B, which are the irradiated surfaces, and the axis (direction along the x axis in FIG. 8) of the direction in which the variable diaphragm 170 controls the illumination light coincide. Further, the variable diaphragm 170 cuts off the illumination light almost linearly from at least one direction. In the present exemplary embodiment, the variable diaphragm 170 is a mechanism for cutting off the illumination light from the ±x direction. Therefore, if the light is cut off with the variable diaphragm 170, eventually an almost rectangular region with a uniform illumination intensity distribution will be obtained in the region of the irradiated surface which is irradiated with the illumination light by merely reducing the width of the rectangular shape in the ±x axis direction, in the same manner as in exemplary Embodiment 1. Therefore, if the illumination light is scanned along the x axis direction over the irradiated surface, then only the brightness can be varied, while conducting irradiation with the illumination light having a uniform illumination intensity distribution with respect to the region on the irradiated surface which is scanned with the illumination light. Further, in this exemplary embodiment, the conjugate surfaces of liquid-crystal light valves 850R, 850G, 850B are almost in a central position of the rotary prism 130. Therefore, the variable diaphragm 170 is provided in the space of the rotary prism 130, which is in the vicinity of the conjugate surfaces, on the side of the light source 110, but the same effect can be obtained by disposing the variable diaphragm 170 in the position of the conjugate surface by changing the design of the optical system. Furthermore, the same effect can be obtained with a configuration in which the variable diaphragm of exemplary Embodiment 2 is disposed instead of the variable diaphragm 170.

Further, there is provided a dichroic prism 871 for color separation, which is a color separation optical system to separate the illumination light that passed through the variable diaphragm 170 into at least two illumination lights. As a result, it is possible to obtain a full-color image with a wide dynamic range due to the operation of at least one variable diaphragm 170.

The projector 900 has an optical sensor 690 (not shown in the figure) and a correction circuit 681 (not shown in the figure) identical to those of exemplary Embodiment 4. As a result, the variable diaphragm 170 can be driven by the variable diaphragm drive signal SA described in exemplary Embodiment 4. Further, liquid-crystal light valves 850R, 850G, 850B are driven based on the corrected image signals SB. As a result, the dynamic range of the projected image can be increased.

As described hereinabove, the projector 900 of exemplary Embodiment 6 includes a light source to emit an illumination light, liquid-crystal light valves 850R, 850G, 850B having a plurality of pixels capable of modulating the illumination light, an irradiation optical system to irradiate part of the pixels of the liquid-crystal light valves 850R, 850G, 850B with the illumination light emitted by the light source, a rotary prism 130 to scan the illumination light irradiated with the irradiation optical system, and a variable diaphragm 170 to control the illumination light. Furthermore, the irradiation optical system includes fly-eye lenses 121, 122, the superposition lens 123, and the parallelizing lens 124 as an image forming device to condense the illumination light emitted by the light source and forming an image, and lenses 941, 942R, 943R, 942G, 943G, 942B, 943B for image reforming as an image reforming device to form the image formed by the image forming device on the liquid-crystal light valves. As a result, it is possible to realize a projector in which the dynamic image quality is greatly enhanced, few restrictions are placed on the light source, and a full-color image with a wide dynamic range can be displayed, in the same manner as in exemplary Embodiment 5.

Furthermore, because the distances from the light source to the liquid-crystal light valves 850R, 850G, 850B corresponding to each color light or the distances from the position of the image of each color light formed by the image forming device to the liquid-crystal light valves 850R, 850G, 850B are almost equal for each color light, the illumination light separated into color lights can irradiate some of the pixels of each liquid-crystal light valve with the shapes of the illumination regions having respective equal sizes. Therefore, practically no problem arises because the characteristics of the lenses for image reforming of each color light are similar when the lens 941 for image reforming, which is part of the image reforming device, is used jointly. Obviously, the shift of the image formation state caused by the difference between the wavelengths of color lights can be corrected for each color light by optimizing the lenses 942R, 943R, 942G, 943G, 942B, 943B for image reforming of each color light which are not used jointly. In addition, because the design of the image reforming device has a simple configuration, some of the pixels of each display element are reliably irradiated with the illumination light, blurring of dynamic images is reduced, and light utilization efficiency is high.

Further, the axis where the color separation planes of the dichroic prism 871 for color separation cross each other and the crossing axis of the dichroic prism 872 for color synthesis are disposed on the same axis. For this reason, if almost identical optical components are disposed in all color lights, then an almost identical shape of illumination region can be obtained for each color light and, at the same time, the same scanning direction can be obtained. Therefore, the optical system can be simplified and made more compact because no separate optical component is needed to obtain the same scanning direction.

Further, in the present exemplary embodiment, the lens 941 for image reforming was jointly used for all the color lights, but it is also possible to employ a configuration without such joint use, as in exemplary Embodiment 5. Further, a reflecting mirror capable of bending the optical path may be appropriately disposed between the light source 110 and the dichroic prism 871 for color separation to reduce the likelihood can prevent the light projected from the projection lens 860 from being cut off by the light source 110.

Further, a configuration may be used in which a reflective liquid-crystal panel and a polarizing prism having a polarization separation surface that selectively transmits or reflects a light with a specific polarization are disposed instead of the liquid-crystal light valves 850R, 850G, 850B and reflecting mirrors 982R, 982G, 982B.

The magnification ratio or disposition of the lenses for image reforming has to be changed according to the configuration.

Exemplary Embodiment 7

In the below-described exemplary embodiment, the components identical to those of the above-described exemplary embodiments are assigned with the same reference numerals and the explanation of common operations or actions is omitted. Furthermore, when the same names are assigned, because the functions are almost identical, even if the reference numerals are different, basic explanation is omitted.

Figure 11:
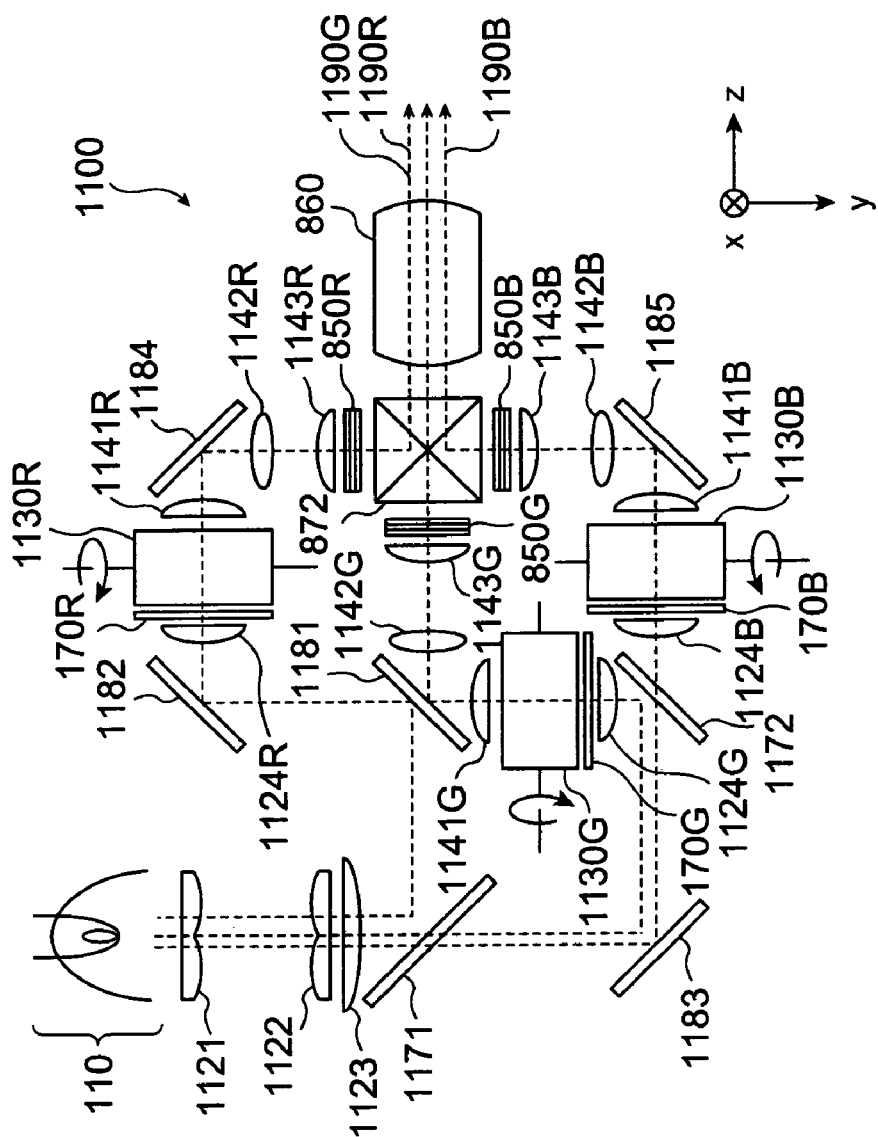
FIG. 11 is a schematic of the projector of exemplary Embodiment 7.

FIG. 11 is a schematic of a projector 1100 of exemplary Embodiment 7 in accordance with an exemplary aspect of the present invention. The projector 1100 includes a light source 110, fly-eye lenses 1121, 1122, a superposition lens 1123, parallelizing lenses 1124R, 1124G, 1124B, rotary prisms 1130R, 1130G, 1130B, variable diaphragms 170R, 170G, 170B, dichroic mirrors 1171, 1172 for color separation, reflecting mirrors 1181, 1182, 1183, 1184, 1185, lenses 1141R, 1142R, 1143R, 1141G, 1142G, 1143G, 1141B, 1142B, 1143B for image reforming, liquid-crystal light valves 850R, 850G, 850B, a dichroic prism 872 for color synthesis, and a projecting lens 860. Further, to simplify the explanation, the display will be conducted with color lights obtained by color separation of the components of the illumination light emitted from the light source and each color light will be denoted in the figure by a light beam parallel to the optical axis. The variable diaphragms 170R, 170G, 170B cut off the illumination light with the same mechanism as the variable diaphragm of exemplary Embodiment 1.

First, the illumination light emitted from the light source 110 passes through the fly-eye lenses 1121, 1122 and superposition lens 1123. The microlenses of the fly-eye lenses 1121, 1122 are molded to have the outer shape with a ratio changed with respect to that of the outer shape of the image formation region of the liquid-crystal light valves 850R, 850G, 850B, which are the spatial light modulation devices, when viewed from the optical axis direction. Here, the outer shape of the image formation region of the liquid-crystal light valves 850R, 850G, 850B is a rectangle with a lateral/longitudinal ratio of 4:3, and the outer shape of microlenses of the fly-eye lens 1121 is a rectangle with a lateral/longitudinal ratio of 4:1. The illumination light that passed through the superposition lens 1123 falls on the dichroic mirror 1171 for color separation and is separated into a red color light 1190R, green color light 1190G, and blue color light 1190B. The dichroic mirror 1171 for color separation has formed thereon a multilayer optical film reflecting the red color light and transmitting the green color and blue color lights and has a function of separating the incident illumination light into the red color light and green and blue color lights.

The red color light is reflected by the reflecting mirrors 1181 and 1182 and then falls on the variable diaphragm 170R and rotary prism 1130R via the parallelizing lens 1124. Further, the green and blue color lights are reflected by the reflecting mirror 1183, fall on the dichroic mirror 1172 for color separation and are separated into the green color light and blue color light. The dichroic mirror 1172 for color separation has formed thereon a multilayer optical film reflecting the green color light and transmitting the blue color light and has a function of separating the incident illumination light into the green color light and blue color light.

The green color light falls on the variable diaphragm 170G and rotary prism 1130R via the parallelizing lens 1124G. The blue color light falls on the variable diaphragm 1701 and rotary prism 1130R via the parallelizing lens 1124B. Therefore, the superposition lens 1123 forms inside the rotary prisms 1130R, 1130G, and 1130B respective images that were established by the outer shape of the microlenses of the fly-eye lens 1121.

Further, variable diaphragms 170R, 170G, 170B are provided in the vicinity of the rotary prisms 1130R, 1130G, 1130B on the side of the light source 110. The projector 1100 has an optical sensor 690 (not shown in the figure) and a correction circuit 681 (not shown in the figure) identical to those of exemplary Embodiment 4. As a result, the variable diaphragms 170R, 170G, 170B are driven by the variable diaphragm drive signal SA described in exemplary Embodiment 4. Further, liquid-crystal light valves 850R, 850G, 850B are driven based on the corrected image signals SB.

The red color light 1190R that passed through the rotary prism 1130R is guided to the liquid-crystal light valve 850R by the lenses 1141R, 1142R, 1143R for image reforming and the reflecting mirror 1184. At this time, the lenses 1141R, 1142R, 1143R for image reforming form the image formed by the fly-eye lenses 1121, 1122, superposition lens 1123, and parallelizing lens 1124R, which are the image forming device, on the liquid-crystal light valve 850R which is a display element.

The green color light 1190G that passed through the rotary prism 1130G is guided to the liquid-crystal light valve 850G by the lenses 1141G, 1142G, 1143G for image reforming and the reflecting mirror 1181. At this time, the lenses 1141G, 1142G, 1143G for image reforming form the image formed by the fly-eye lenses 1121, 1122, superposition lens 1123, and parallelizing lens 1124G, which are the image forming device, on the liquid-crystal light valve 850G which is a display element.

The blue color light 1190B that passed through the rotary prism 1130B is guided to the liquid-crystal light valve 850B by the lenses 1141B, 1142B, 1143B for image reforming and the reflecting mirror 1185. At this time, the lenses 1141B, 1142B, 1143B for image reforming form the image formed by the fly-eye lenses 1121, 1122, superposition lens 1123, and parallelizing lens 1124B, which are the image forming device, on the liquid-crystal light valve 850B which is a display element.

As a result, if the variable diaphragms 170R, 170G, 170B do not cut off the illumination light, the image formation regions of liquid-crystal light valves 850R, 850G, 850B can be irradiated with an illumination light with an almost uniform illumination intensity distribution in the portion which is one third of the image formation region. Further, the rotary prisms 1130R, 1130G, 1130B are disposed as illumination light scanning device. Therefore, the illumination light separated into color lights passes through the rotary prisms, while the optical axis is shifted due to the relationship between the refractive index and rotation of the rotary prism 130. For this reason, each color light obtained by color separation uniformly irradiates the entire image formation region, while scanning over the entire image formation region of respective liquid-crystal light valve 850R, 850G, 850B. Therefore, repeatedly conducting high-speed scanning of the illumination light over the image formation region of the liquid-crystal light valves 850R, 850G, 850B makes it possible to irradiate the inside of the image formation region with the illumination light with a uniform illumination intensity distribution, if integration over a certain fixed interval is conducted. Further, if attention is paid to part of the image formation region, the illumination light sometimes falls thereon and sometimes not and, therefore, a phenomenon identical to intermittent switching occurs.

The illumination light of each color that fell on the image formation regions of the liquid-crystal light valves 850R, 850G, 850B is modulated based on the electric signal in the image formation regions of the liquid-crystal light valves 850R, 850G, 850B and guided in the direction of the projection lens 860, which is the projection device, with the dichroic prism 872 for color synthesis.

The illumination light falling on the projection lens 860 is projected onto a screen (not shown in the figure) and an image is displayed on the screen. At this time, the images of liquid-crystal light valves 850R, 850G, 850B that have modulated the red color light, green color light, and blue color light are displayed with superposition on the screen. Therefore, a full-color display is possible. Furthermore, the rotation position, or rotation speed, or rotation direction of the rotary prisms 1130R, 1130G, 1130B are controlled so that the positions of images corresponding to each color light that were formed by the group of lenses for image reforming in the image projected onto the screen coincide with each other. Specifically, the scanning directions of the images corresponding to each color light also coincide.

Further, the axis of the direction in which the illumination light is scanned in the liquid-crystal light valves 850R, 850G, 850B, which are the irradiated surfaces, and the axis (direction along the x axis in FIG. 11) of the direction in which the variable diaphragms 170R, 170G, 170B control the illumination light coincide. Further, the variable diaphragms 170R, 170G, 170B cut off the illumination light almost linearly from at least one direction. In the present exemplary embodiment, the variable diaphragms 170R, 170G, 170B are a mechanism to cut off the illumination light from the ±x direction. Therefore, the variable diaphragm 170 is a mechanism for cutting off the illumination light from the ±x direction. As a result, if the light is cut off with the variable diaphragm 170, eventually an almost rectangular region with a uniform illumination intensity distribution will be obtained in the region of the irradiated surface which is irradiated with the illumination light by merely reducing the width of the rectangular shape in the ±x axis direction, in the same manner as in exemplary Embodiment 1. Therefore, if the illumination light is scanned along the x axis direction over the irradiated surface, then only the brightness can be varied, while conducting irradiation with the illumination light having a uniform illumination intensity distribution with respect to the region on the irradiated surface which is scanned with the illumination light. Further, in this exemplary embodiment, the conjugate surfaces of liquid-crystal light valves 850R, 850G, 850B are almost in a central position of the rotary prism 130. Therefore, the variable diaphragm 170 is provided in the space of the rotary prisms 1130R, 1130G, 1130B, which is in the vicinity of the conjugate surfaces, on the side of the light source 110, but the same effect can be obtained by disposing the variable diaphragms 170R, 170G, 170B in the positions of respective conjugate surfaces by changing the design of the optical system.

Thus, in the present exemplary embodiment, there are dichroic mirrors 1171, 1172 for color separation, which are a color separation optical system to separate the illumination light into illumination lights of at least two colors. Further, the variable diaphragms 170R, 170G, 170B are provided in an optical path of at least one color light of the separated illumination light, in the present exemplary embodiment, in optical paths for three color lights. The quantity of light can thereby be controlled for each specific color light. As a result, it is possible to realize a projector in which the dynamic image quality is greatly enhanced, few restrictions are placed on the light source, a light utilization efficiency is high and a full-color image optimized for each color light and having a wide dynamic range can be displayed.

Figure 12:
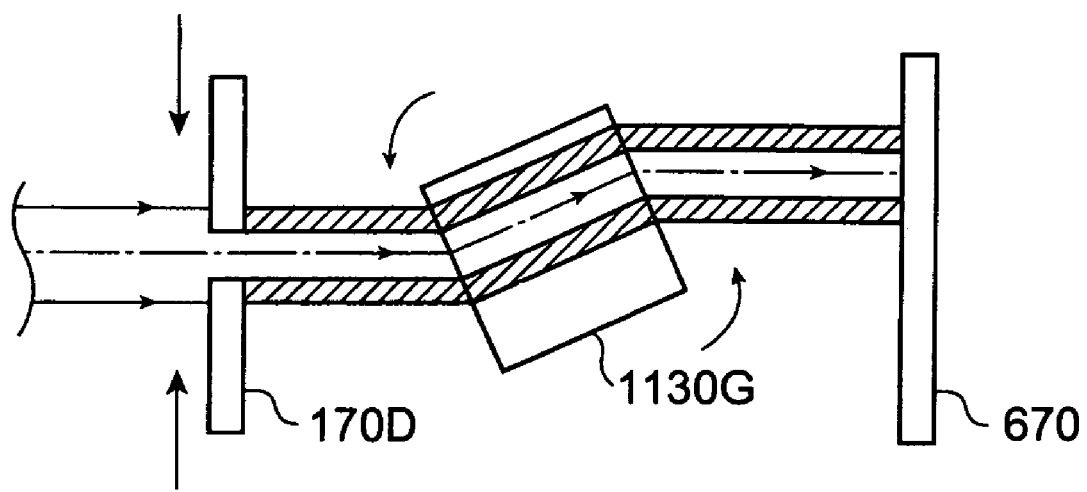
FIG. 12 is a schematic of a modification of the variable diaphragm.

A modification example of the variable diaphragm will be explained based on FIG. 12. Here, to simplify the explanation, the illumination light is presented as a luminous flux parallel to the optical axis. With all the above-described variable diaphragms, the quantity of light was controlled by cutting off the illumination light, but the variable diaphragm 170D of the present modification example, uses a dichroic filter to control the quantity of light only with respect to a specific wavelength region contained in the illumination light. Specifically, a color filter which changes the transmittance of light with respect to a specific wavelength region is used instead of cutting off the light mechanically with a shutter blade to control the quantity of light. Further, the quantity of light falling on the color filter is changed by displacing the position of the color filter in the luminous flux of the illumination light.

As a result, the color purity of the illumination light can be varied in a state with a uniform distribution of quantity of light. For example, if the green color light of exemplary Embodiment 7 is considered as a green color light with a yellow component mixed therewith, the variable diaphragm 170D has a transmission characteristic which cuts off the yellow component. In this case, the light denoted by hatching in FIG. 12 after it has passed through the variable diaphragm 170D is a green color light from which the yellow component has been cut off. The component that propagated as is, without passing through the variable diaphragm 170D, is a green color light with a yellow component mixed therewith. Such color lights are high-speed scanned over the screen 670 by rotating the rotary prism 1130G. As a result, the viewer recognizes the illumination light in which colors are mixed and color purity is changed. Therefore, in the present modification example, the illumination light of a yellow-green system can be converted into the illumination light of a deep green system. Further, even more optimum projected image can be obtained by conducting image processing with the correction circuit in addition to employing the variable diaphragm 170D. The variable diaphragm that controls the quantity of light only with respect to a specific wavelength region in the above-described manner is not limited to the wavelength region of the present exemplary embodiment and can be varied. Further, it can be adapted not only to projectors, but also to image forming devices and illumination devices. Therefore, it can be adapted not only to color lights, such as red, green, or blue color lights, but also to white light. For example, with certain emission characteristics of light source lamps, an emission spectrum in the unnecessary orange color region is sometimes present in addition to white light. In this case, an illumination light from which the unnecessary orange color light has been cut off can be obtained by using as a variable diaphragm a dichroic filter capable of cutting off the light in the wavelength region of orange light.

The present invention is not limited to optical systems of the illumination devices, image display devices, and projectors employed in the exemplary embodiments and may be also applied to optical systems of other illumination devices, image display devices, and projectors, without departing from the spirit of the present invention. In other words, the disposition of lenses or optical elements for color separation can be varied without departing from the spirit of the present invention. Further, in addition to a regular quadratic prism, the rotary prism may be also in the form of other regular polygonal prisms. Moreover, configurations other than rotary prisms may be employed, provided that they have a function of an illumination light scanning device. Further, the circuit configuration, optical sensors, or variable diaphragms also may be used in combinations with illumination devices, image display devices, and projectors. In the present exemplary embodiments, a transmission-type liquid-crystal light valve was used as the spatial light modulation device, but such a configuration is not limiting. For example, a reflection-type liquid-crystal light valve or DMD (manufactured by Texas Instruments, Inc.) can be used without departing from the spirit of the present invention.

INDUSTRIAL APPLICABILITY

As described hereinabove, the illumination device in accordance with exemplary aspect of the present invention is useful for illumination in image display devices. Furthermore, it is suitable for projectors to project displayed images of image display devices.

The invention claimed is:

1. An illumination device, comprising:
   a light source to emit an illumination light;
   a color separation optical system to separate the illumination light into illumination lights of at least two colors;
   a variable diaphragm disposed in the optical path of each of the at least two colors of the separated illumination light to control the quantity of the separated illumination light for each of the at least two colors the quantity of light being controlled with respect to a specific wavelength region contained in the illumination light; and
   an illumination light scanning device to scan the illumination light that passed through each variable diaphragm over an irradiated surface, the axis of the direction in which the illumination light is scanned over the irradiated surface almost coinciding with the axis of the direction in which each variable diaphragm controls the illumination light.

2. The illumination device according to claim 1, the variable diaphragm being provided in a conjugate plane or in a vicinity of the conjugate plane of the irradiated surface.

3. The illumination device according to claim 1, the variable diaphragm being capable of controlling the quantity of light only with respect to a specific wavelength region contained in the illumination light.

4. The illumination device according to claim 2, further comprising:
   a rod to reflect the illumination light falling from an incoming end surface by an inner wall or outer wall and causing the light to be emitted from an outgoing end surface; and
   an image forming lens to form an image of the outgoing end surface of the rod on the irradiated surface or a conjugate plane of the irradiated surface,
   the variable diaphragm being provided in a vicinity of the outgoing end surface of the rod, at a conjugate plane of the outgoing end surface, or in a vicinity of a conjugate plane of the outgoing end surface.

5. The illumination device according to claim 2, further comprising:
   a lens array unit including a plurality of fly-eye lenses to split the illumination light into a plurality of partial lights and condense them; and
   a superposition lens unit to superimpose the partial lights on the irradiated surface or a plane conjugate with the irradiated surface, the variable diaphragm being provided in a vicinity of the fly-eye lenses, at a conjugate plane of the fly-eye lenses, or in a vicinity of the conjugate plane of the fly-eye lenses.

6. The illumination device according to claim 1,
the illumination light scanning device having a rotary prism which is rotated to vary the refraction angle of the illumination light and scan the illumination light.

7. An image display device, comprising:
the illumination device according to claim 1 and
a spatial light modulation device to modulate the illumination light from the illumination device according to the image signal.

8. A projector, comprising:
the image display device according to claim 7 and a projection device to project the image displayed with the image display device.

9. The projector according to claim 8, comprising:
an optical sensor to detect at least one of an illumination intensity and chromaticity of the image projected with the projection device, wherein both a quantity of light controlled with the variable diaphragm by using detected data from the optical sensor and a modulation quantity of the illumination light modulated with the spatial light modulation device are varied.

* * * * *